(12) United States Patent
Morel et al.

(10) Patent No.: US 9,026,602 B2
(45) Date of Patent: May 5, 2015

(54) AUTOMATICALLY UPLOADING USER PROFILE INFORMATION

(71) Applicant: Quickmii Corporation, Redwood City, CA (US)

(72) Inventors: Sébastien Morel, San Francisco, CA (US); Nicolas Genty, Paris (FR)

(73) Assignee: Quickmii Corporation, Redwood City, CA (US)

( * ) Notice: Subject to any disclaimer, the term of this patent is extended or adjusted under 35 U.S.C. 154(b) by 0 days.

(21) Appl. No.: 14/320,294

(22) Filed: Jun. 30, 2014

(65) Prior Publication Data

US 2015/0006672 A1 Jan. 1, 2015

Related U.S. Application Data

(60) Provisional application No. 61/841,188, filed on Jun. 28, 2013.

(51) Int. Cl.
*G06F 15/16* (2006.01)
*H04L 29/08* (2006.01)
(Continued)

(52) U.S. Cl.
CPC ............ *H04L 67/10* (2013.01); *G06Q 30/0269* (2013.01); *H04L 67/306* (2013.01); *H04W 8/18* (2013.01); *G06Q 50/01* (2013.01)

(58) Field of Classification Search
CPC ....... H04L 67/306; H04W 8/18; G06Q 50/01; G06Q 30/0269
USPC .................................. 709/203, 217, 228, 206
See application file for complete search history.

(56) References Cited

U.S. PATENT DOCUMENTS 7,753,260 B2 7/2010 Kanatani et al.
2012/0130794 A1* 5/2012 Strieder ..................... 705/14.27
(Continued)

FOREIGN PATENT DOCUMENTS

JP 2007306260 A 11/2007
KR 10-2000-0036834 A 7/2000
(Continued)

OTHER PUBLICATIONS

Korean Intellectual Property Office, "Search Report" in application No. PCT/2014/044951, dated Oct. 16, 2014, 13 pages.
(Continued)

*Primary Examiner* — David Lazaro
(74) *Attorney, Agent, or Firm* — Hickman Palermo Becker Bingham LLP; Daniel D. Ledesma

(57) ABSTRACT

Techniques for automatically transmitting user profile data over a network are provided. In one technique, a browser displays a form and a QR code (or other form of encoded data) on a webpage. A mobile application scans the QR code, which causes the mobile application to identify user profile data (that may be stored locally with respect to the mobile application) and send the user profile data to a Campaign server. The Campaign server causes the form that is displayed by the browser to be filled in with the user profile data. The browser than transmits the filled-in form to a partner server that provides the webpage. In another technique, a mobile application scans a QR code, which may be displayed on a flyer, a poster, a computer screen, or a television screen. The mobile application identifies and transmits user profile data to a Campaign server.

38 Claims, 39 Drawing Sheets

(51) Int. Cl.
*G06Q 30/02* (2012.01)
*H04W 8/18* (2009.01)
*G06Q 50/00* (2012.01)

(56) References Cited

U.S. PATENT DOCUMENTS

2014/0034722 A1* 2/2014 Han .............................. 235/375
2014/0114738 A1* 4/2014 Tseng et al. ............... 705/14.27

FOREIGN PATENT DOCUMENTS

| KR | 10-0423580 B1 | 3/2004 |
| KR | 10-2012-0037330 A | 4/2012 |
| KR | 10-2012-0092900 A | 8/2012 |

OTHER PUBLICATIONS

Korean Claims in application No. PCT/2014/044951, dated Oct. 16, 2014, 4 pages.

* cited by examiner

Quickmii Web Intégration

Copy/paste this code inside your website and follow the documentation API to get the good QM code.

Applicaiton ID: b06c2b942c31a39d7dd291c5bf6d971d

Javascript callback method: scanModule.finish

Callback method name: can be used in your website. It called after the form fill.

QM HTML code:
```
if ( window.jQuery ) {
  var QuickMiiSettings = {
    applicationid:
'b06c2b942c31a39d7dd291c5bf6d9
71d258b56aeqOm',
    scannedCallback
  };
  document.write('<script
```

Close

AUTOMATICALLY UPLOADING USER PROFILE INFORMATION

CROSS-REFERENCE TO RELATED APPLICATIONS; BENEFIT CLAIM

This application claims the benefit of U.S. Provisional Application No. 61/841,188, filed Jun. 28, 2013, the entire contents of which is hereby incorporated by reference as if fully set forth herein, under 35 U.S.C. §119(e).

FIELD OF THE DISCLOSURE

The present disclosure relates to user profile information and, more specifically, to automatically transmitting user profile information using a unidirectional retrieval mechanism.

BACKGROUND

Filling in an online form on a website is a common activity that is typically long and laborious, regardless of whether the website is displayed on a desktop computer, a laptop computer, a tablet computer, or a mobile phone. Forms are required for registering with certain activities, reward programs, online contests, etc. Many forms require the same information, such as first name, last name, mailing address, email address, and phone number. Thus, a user might find him/herself repeatedly entering the same information for each program, activity, or contest that requires a form to register. Because filling a form is a manual activity, it is prone to errors.

Additionally, many people do not register for contests, reward programs, etc. when they discover that they have to fill out a form. One of the main reasons for not filling out a form is that the form is too long. On an e-commerce website, such people represent significant unrealized revenue.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2D depicts an example display of a digital form that is filled in with requested user profile data;

FIG. 6A-6J depict example interfaces of a campaign creation and management application;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for automatically transmitting user profile information using a traditionally retrieval-only mechanism. The transmission of user profile information may result in automatically filling out a form or sending the profile information to a third party for registration. A traditional unidirectional retrieval mechanism (URM), such as a two-dimensional barcode, logo recognition, near field communication (NFC), a radio-frequency identification (RFID) mechanism, and ultrasound decryption, is leveraged to allow a user's profile information to be identified and transmitted without the user having to manually specify each item of profile information. In this way, a traditional URM is used in a bi-directional manner.

While embodiments are not limited to any particular type of URM, for purposes of ease of explanation, embodiments are described in the context of QR codes, which is a type of two-dimensional barcode. Thus, one use case involves a QR code that is displayed at a store checkout line to entice shoppers to register with the store's rewards program. However, instead of a QR code, the store checkout line may use a NFC mechanism or RFID mechanism that includes a wireless transmitter than is configured to send a signal that is encoded with data that instructs a mobile application to identify and upload user profile information.

User profile information may include a first name, a middle name, a last name, a mailing address, an email address, one or more phone numbers, a birthday, a job title, a current geographical location, and/or a social network (e.g., Facebook) ID. Embodiments are not limited to any particular type of user profile information.

Process Overview

Figure 1:
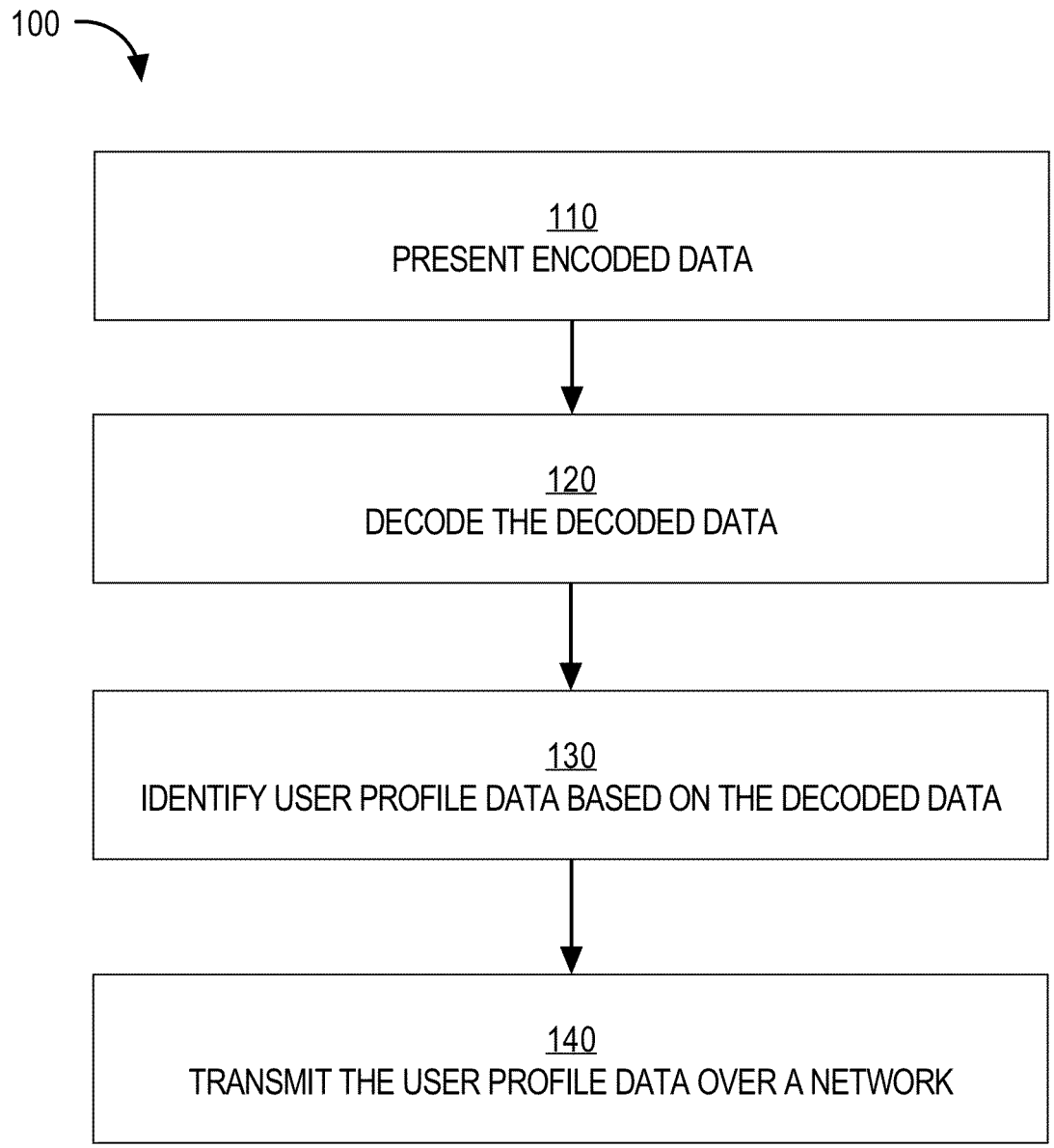
FIG. 1 is a flow diagram that depicts a process for automatically transmitting user profile data over a network, in an embodiment.

FIG. 1 is a flow diagram that depicts a process 100 for automatically transmitting user profile data over a network, in an embodiment.

At block 110, encoded data is presented. The encoded data may be a one-dimensional or a two-dimensional barcode. Alternatively, the encoded data may be part of an image, such as an image of a logo. Thus, the encoded may be displayed on a printed medium, such as a paper flyer or sticker. Alternatively, the encoded data may be a displayed on a computer display, such as through a webpage. The entity or party that displays the encoded data is different than the entity or party that decodes the encoded data.

Instead of being something that is displayed, the encoded data may be in a signal that is generated by a signal transmitter using NFC or RFID technology.

At block 120, the encoded data is decoded to generate decoded data. For example, if the encoded data is displayed, such as a logo or a QR code, then the encoded data is scanned by a scanner to generate decoded data. The scanner may be a software application that executes on a mobile device, such as a "smartphone" or tablet computer. If the encoded data is part of a signal that is transmitted using NFC or RFID technology, then the encoded data is decoded to generated decoded data.

At block 130, based on the decoding, user profile data is identified. The user profile data may be stored on the same device that includes the scanner or signal decoder. Alternatively, the user profile data may be retrieved from a remote source over a network.

Block 130 may involve identifying a strict subset of the available user profile data. For example, while the available user profile data may include birthday information, the birthday information may be not be identified and subsequently transmitted.

The encoded data may encode target data that indicates the types of user profile data that are requested or required. For example, the target data may indicate that a user's last name, first name, and email address are required and that the user's current geographic location is requested.

At block 140, the identified user profile data is transmitted over a network. Block 140 may involve automatically filling out a form that is displayed on another device. All or a portion of the user profile data may be transmitted to a server over the network. The transmission of the filled out form may be triggered by user input that indicates that the filled out form should be submitted. For example, a user may desire to change, before transmission, one or more automatically filled in fields and/or one or more blank fields. Alternatively, instead of filling out a form, the user profile information may be transmitted without first filling out a form. In this alternative, user input may or may not be required to transmit the user profile data over a network.

The user profile data is transmitted to a particular destination. The particular destination may be pre-configured or hardcoded in an application that identifies the user profile data. Alternatively, an identity (e.g., URL) of the particular destination may be encoded in the encoded data itself.

First Scenario

Filling a Form

Figure 2A:
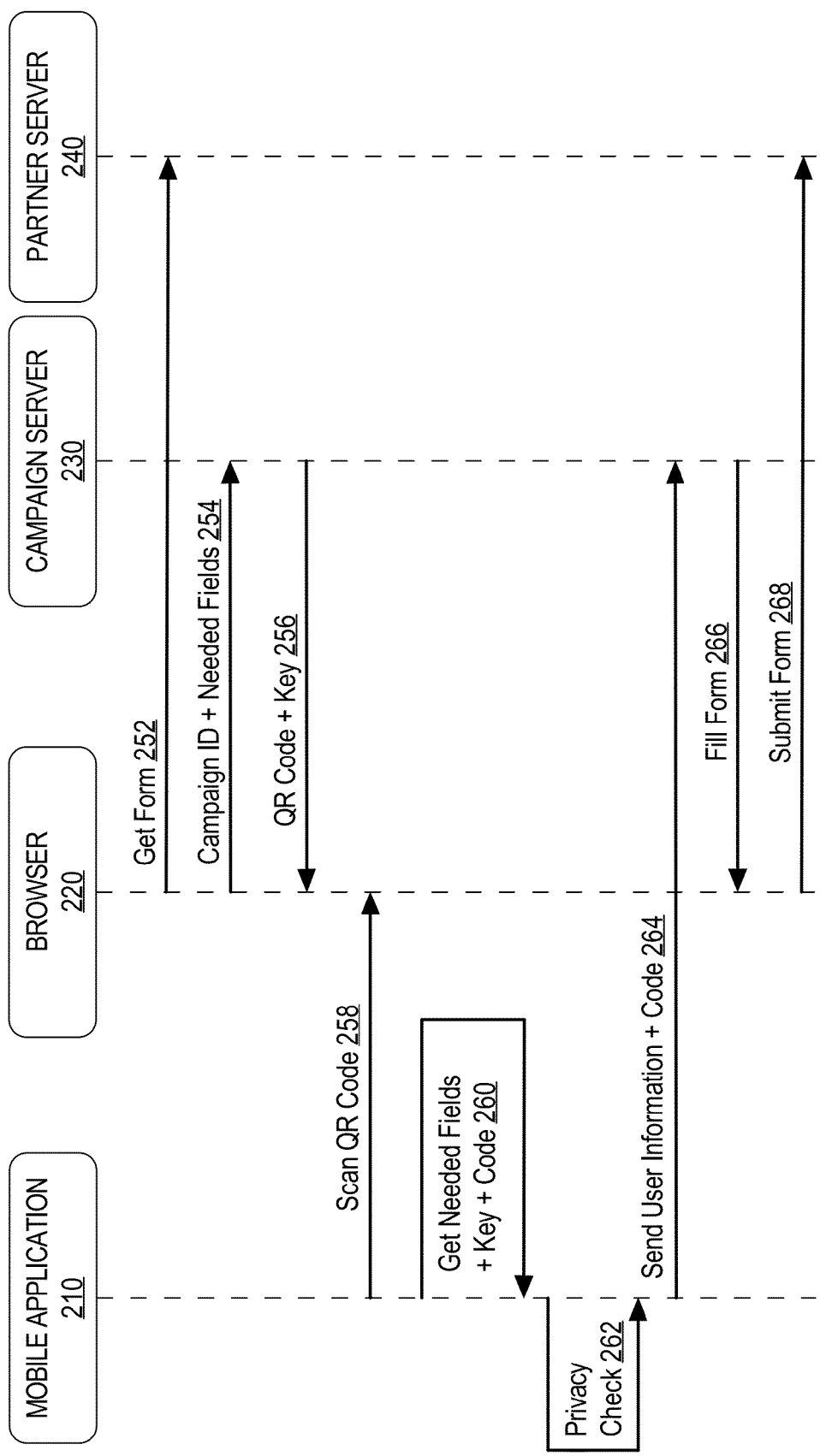
FIG. 2A is a sequence diagram that depicts a process for automatically filling out a form with user profile information and transmitting the filled out form over a network, in an embodiment.

FIG. 2A is a sequence diagram that depicts a process 200 for automatically filling out a form with user profile information and transmitting the filled out form over a network, in an embodiment. FIG. 2A depicts four actors: mobile application 210, browser 220, campaign server 230, and partner server 240. Mobile application 210 executes on a mobile device, such as a smartphone, a tablet computer, or a laptop computer. The mobile device includes a camera and a scanning application that is configured to scan a QR code (whether displayed on a computer screen or printed on a medium, such as paper) and decode information encoded on the QR code.

Browser 220 is a component of a device that is separate from the mobile device upon which mobile application 210 executes. Browser 220 is configured to allow a user to retrieve and display web pages on a screen, such as a CRT monitor, an LCD display, or a liquid plasma display. Browser 220 may be part of a desktop computer, a laptop computer, or a TV.

Campaign server 230 is configured to create and manage campaigns on behalf of one or more partners that request the campaigns. A campaign is time period in which a particular partner seeks to obtain user profile data from multiple end-users, usually as part of way to register people in a contest, a rewards program, etc. A campaign has a start date and may have an end date. Alternatively, a campaign may be ongoing and thus, may not have an end date, at least initially.

In order to manage campaigns, campaign server 210 generates and transmits QR codes to browser 220 (and other browsers, not depicted) and to cause a form to be filled in with user profile data. Campaign server 230 may be implemented in hardware, software, or a combination of hardware and software. Also, campaign server 230 may be implemented on a single computing device or may be distributed across multiple computing devices.

Partner server 240 is configured to reply to requests for content and to receive user profile data. For example, partner server 240 may comprise a web server that receives HTTP requests and provides HTTP responses. Partner server 240 may be involved in any type of e-commerce, such as online shopping. Partner server 240 may be owned or operated by a different party than the party that operates or own campaign server 230. For example, one partner may be a manufacturer of baby bottles desiring to attract new consumers of its baby bottles, while another partner may be a store chain desiring to attract store customers to sign up for a loyalty program, while another partner may be an individual desiring to sell his/her car.

Although only a single mobile application, a single browser, and a single partner server are depicted, campaign server 230 may support or interact with many mobile applications, many browsers, and many partner servers. Thus, campaign server 230 may store information about multiple mobile applications, multiple mobile application users, and multiple partners, where each user and each partner is associated with one or more QR codes.

Prior to process 200, a representative of the partner may have communicated with a representative (or computer system) of campaign server 230 to establish a QR code campaign to entice users to submit their respective user profile data to partner server 240. Campaign server 230 is responsible for maintaining the QR code campaigns on behalf of one or more partners.

At block 252, browser 220 sends, to partner server 240, a request that results in retrieving a form from partner server 240. The request may be a HTTP request for a web page and the web page includes the form. Browser 220 may send the request in response to executing code (e.g. JavaScript code) in a web page provided by partner server 240 and received prior to block 252. Also, prior to sending the request, browser 220 reads the form to identify the needed or requested fields.

At block 254, browser 220 sends, to campaign server 230, a request for a QR code and one or more needed or requested fields. The request may include a campaign identifier that is included in the executable (e.g., JavaScript) code. The campaign identifier is associated with a particular campaign that is managed by campaign server 230. Campaign server 230 uses the campaign identifier to generate a QR code that is associated with the particular campaign.

In a related embodiment, instead of browser 220 sending the needed or requested fields, campaign server 230 stores, in association with a campaign identifier, field data that identifies one or more requested or needed fields.

At block 256, browser 220 receives, from campaign server 230, a form, a QR code, a key, and a code identifier and displays the form and QR code on a computer display. (The code identifier may be encoded in the QR code and not separately identified by browser 220.) The form and QR code may be displayed simultaneously. The code identifier uniquely identifies, to campaign server 230, the QR code relative to other QR codes that campaign server 230 generates. The key uniquely identifies, to campaign server 230, browser 220 relative to other browsers with which campaign server 230 interacts.

Block 256 may first involve campaign server 230 receiving the campaign identifier, generating a key that identifies browser 220, generating (or at least identifying) a code identifier, and generating a QR code that includes the code identifier and, optionally, the key. Additionally or alternatively, the key is transmitted separately from the QR code but in the same transmission (or response) from campaign server 230.

Figure 2B:
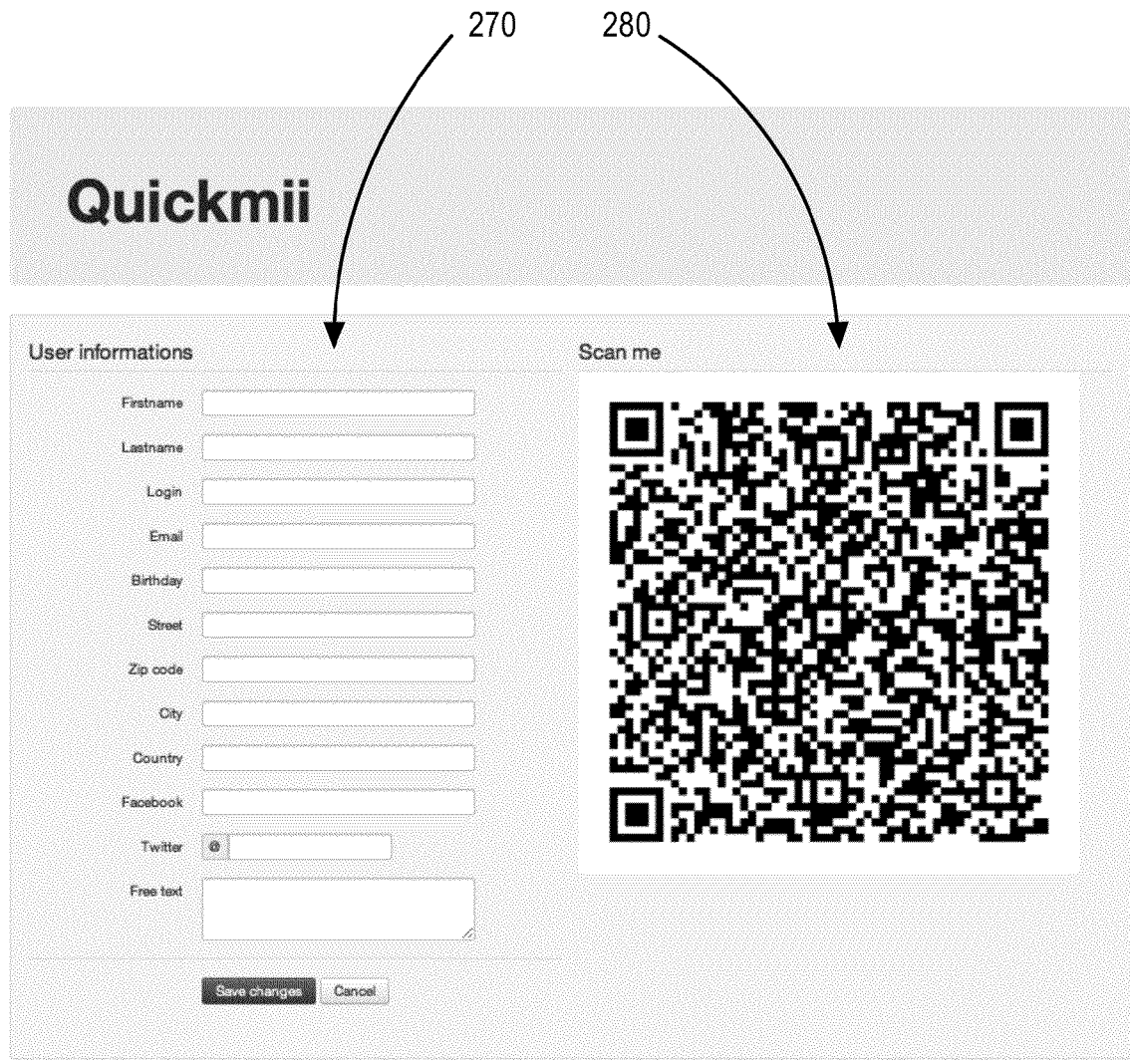
FIG. 2B depicts example display content that includes a digital form.

FIG. 2B depicts example display content that includes form 270. The example display content may be only a portion of a web page that is displayed to the user. Form 270 comprises multiple fields, each pertaining to a different item of user profile information. Specifically, the fields of form 270 are for a user's first name, last name, login, email, birthday, street address, zip code of residence, city of residence, country of residence, Facebook ID or URL, Twitter ID, and free text for additional information.

The example display content of FIG. 2B also includes QR code 280. QR code 280 encodes the fields that are required or requested by the party that operates or owns partner server 240. QR code 280 also encodes the code identifier. The code identifier is used for campaign server 230 to associate user profile data with the appropriate QR code, which is associated with a particular campaign.

In an embodiment, each display of a QR code that is sent from campaign server 230 is unique. Thus, if browser 220 displays a second QR code in the context of a webpage provided by partner server 240 (or another partner server, not depicted), then the second QR code is different than the first QR code. QR codes in this filling form scenario are unique because a key/code identifier pair, which is encoded in each QR code, is unique. The key is the way in which campaign server 230 identifies the browser and the code identifier is the way campaign server 230 identifies the QR code.

In order to transmit the data between campaign server 230 and browser 220, a (e.g., HTTPS) communication channel is established and kept open so that the form may be eventually filled in by campaign server 230, as described below in block 266. After block 256, browser 220 may periodically send (e.g., every five seconds), to campaign server 230, a request for user profile data, where the request includes the key. Campaign server 230 may or may not eventually send, to browser 220, user profile data. In the following example, campaign server 230 does send browser 220 user profile data.

At block 258, mobile application 210 scans the QR code that is displayed. In an embodiment, the QR code is designed so that a generic scanning application (or scanner) can decode at least a portion of the data encoded in the QR code. However, the scanner will not be able to communicate with campaign server 230. Nevertheless, the QR code may begin with a URL, such as http://www.quickmii.com/url?ENCRYPT-EDDATA, followed by encrypted data that the generic scanning application is unable to decrypt. Upon reading the URL, the scanner will redirect the user to page from where mobile application 210 can be downloaded. If the user chooses, mobile application 210 is downloaded to the user's mobile device, after which mobile application 210 is activated to perform the scan of the QR code again. Thus, a scanner "believes" that the QR code encodes just a URL and redirects the user to that URL. Therefore, the process of using mobile application 210 the first time is almost transparent for a generic scanner-only user. This is possible because not all of the data in the QR code may be encrypted.

At block 260, mobile application 210 identifies, based on the scan, multiple data items that are encoded in the QR code, such as the needed/requested fields, the key, and the code identifier.

Figure 2C:
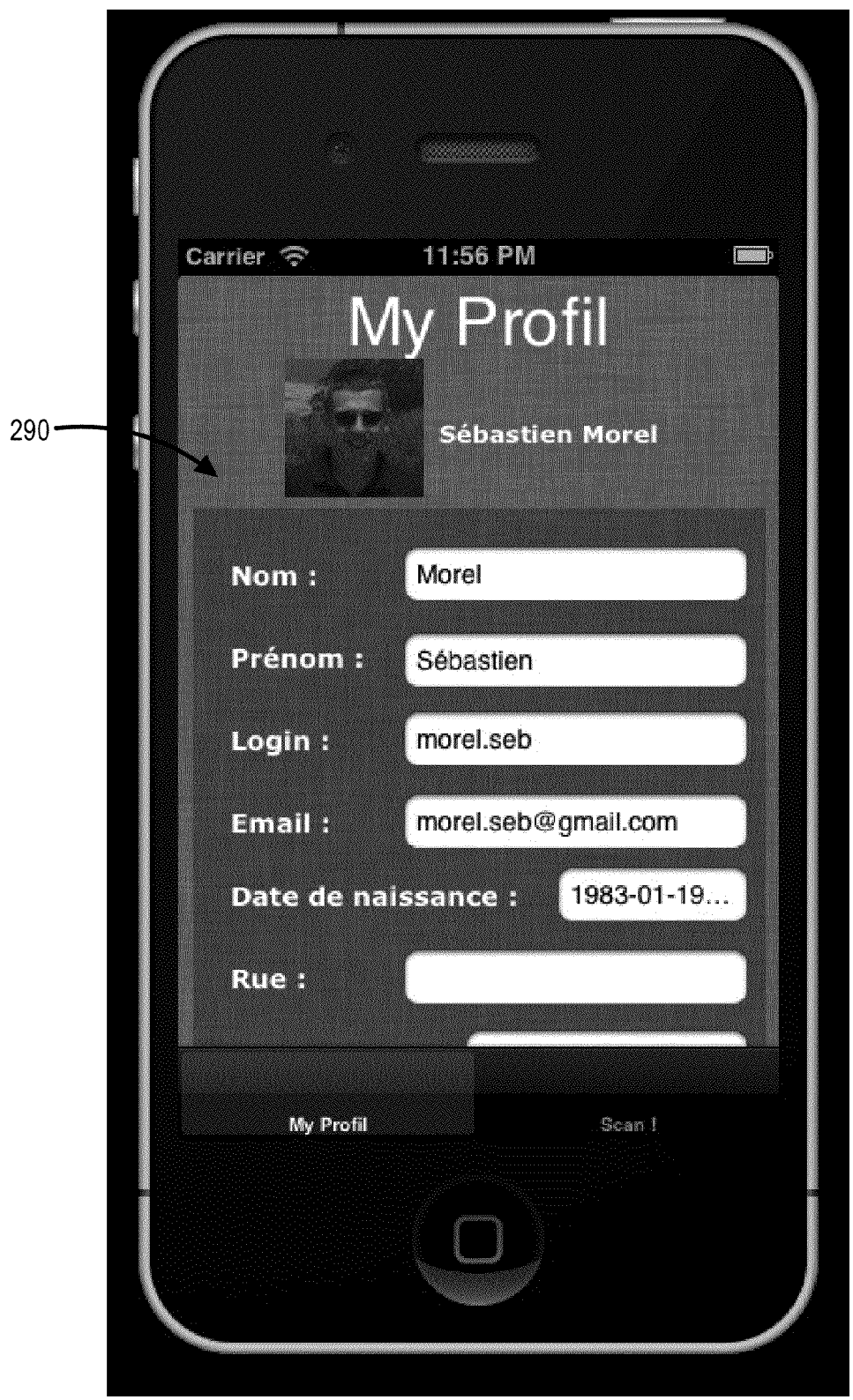
FIG. 2C depicts an example display of user profile data pertaining to requested fields.

Block 260 may also include displaying, on the mobile device that executes mobile application 210, the requested fields and, optionally, the user profile data associated with the requested fields. FIG. 2C depicts an example display 290 of user profile data pertaining to the requested fields. If the screen size of the user's mobile device is not large enough to display all the requested fields, then the user may need to scroll down to view the other requested fields. Alternatively to displaying the requested fields (and/or the requested user profile data), process 200 may proceed to block 262 or 264 once the data items encoded in the QR code are identified based on the scan.

In an embodiment, the QR code also includes certification data that indicates whether the partner associated with the form is a certified partner. Campaign server 230 may perform one or more checks to determine whether to certify a partner. If a partner is certified, then that signifies a level of trust given to the partner. The user of mobile application 210 may be more willing to share his/her profile data (especially more personal information, such as birthday, mailing address, and current geographic location) with a certified partner as opposed to an non-certified partner.

At block 262, mobile application 210 performs a privacy check to determine whether one or more requested or required fields indicated in the QR code conflict with a policy associated with a user's profile data. For example, the policy may indicate that birthday information should not be shared. The privacy check involves determining that this policy exists and that one of the requested or required fields is a birthday field. The user may be allowed to manually override this policy and provide input that indicates that the birthday information (or a portion thereof, such as birth year only) may be shared. Block 262 may be optional, especially if the user profile data is not associated with any policy that indicates that certain profile data is not to be shared without explicit user approval.

At block 264, mobile application 210 sends, to campaign server 230, user profile information (or a portion thereof) and the code identifier extracted from the QR code.

Block 264 involves campaign server 230 receiving the code identifier and the user profile information, identifying the key that is associated with the code identifier, and identifying the appropriate browser in which to send the received user profile information. Thus, campaign server 230 may store mapping data that associates code identifiers with keys. Thus, campaign server 230 uses the code identifier (received from mobile application 210) to look up the appropriate key in the mapping data.

At block 266, campaign server 230 causes the form to be filled in based on the received user profile information. Embodiments are not limited to how the form displayed by browser 220 is filled in. For some browsers, JSONP (JavaScript Object Notation with Padding) may be used. For other browsers, CORPS (Cross Origin Request Policy) may be used.

Figure 2D:
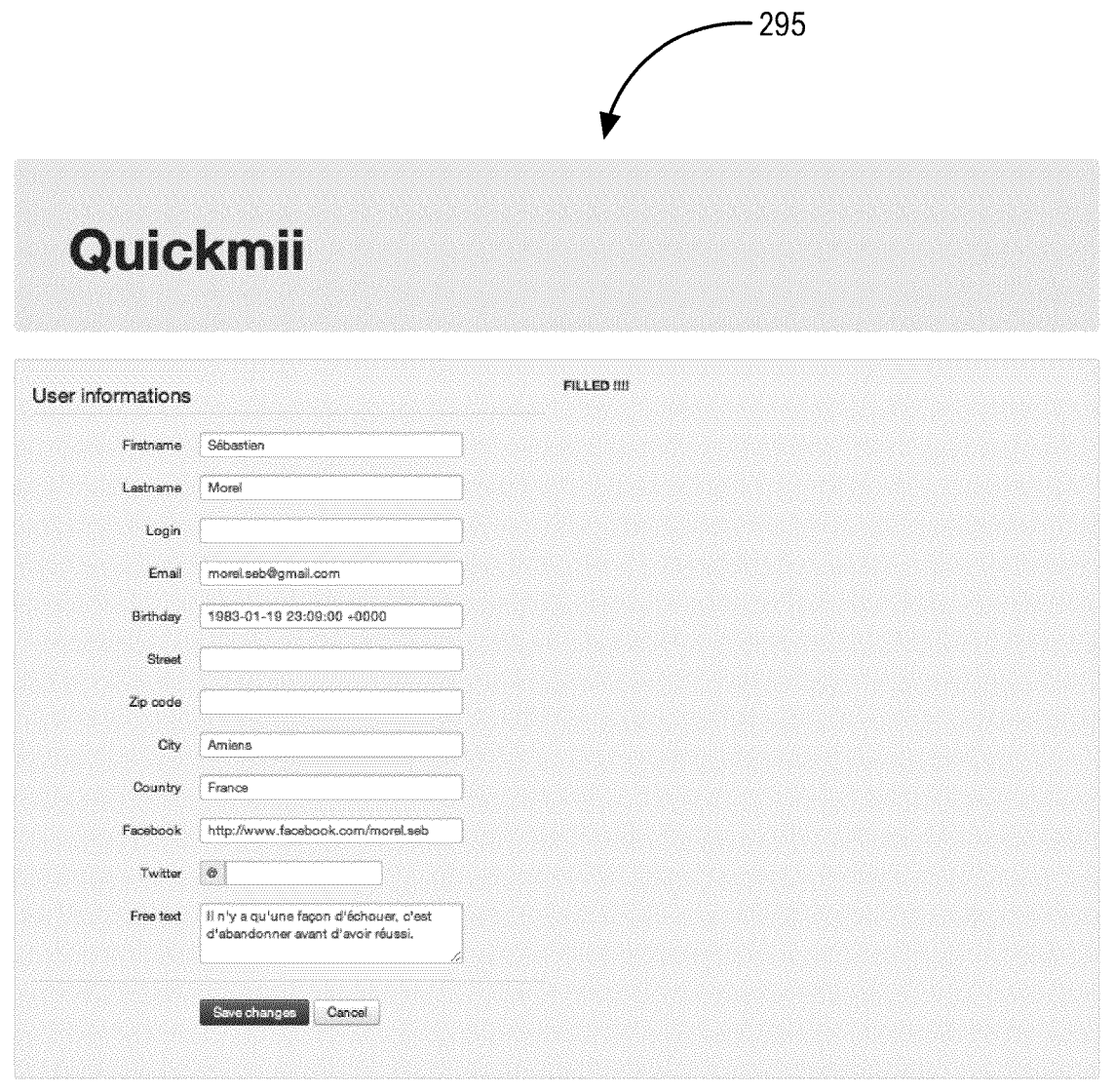

FIG. 2D depicts an example display 295 of form 270 that is filled in with the requested user profile data, or a portion thereof if the user declined sharing one or more user profile data items of one or more requested fields. The fields of form 270 that are not filled in with user profile data may be fields that were not requested (as reflected in QR code 280) and/or may correspond to user profile data items that the user did not want to share.

Embodiments are not limited to any particular communication protocol that is used to send data between different components depicted in FIG. 2A, such as between mobile application 210 and campaign server 230 and between browser 220 and campaign server 230. One example communication protocol is HTTPS (or Hypertext Transfer Protocol Secure), which is a communications protocol for secure communication over a computer network, with especially wide deployment on the Internet. HTTPS is the result of layering HTTP on top of the SSL/TLS protocol, thus adding the security capabilities of SSL/TLS to standard HTTP communications.

In an embodiment, the encoded data within a QR code is cryptographically compressed prior to transmission from campaign server 230 to browser 220. This means that mobile application 210 implements a decryption technique in order to read and identify the content of the QR code, such as the code identifier, the requested/required fields, and, optionally, the key.

Second Scenario

Send User Profile Data Directly to Partners

Figure 3A:
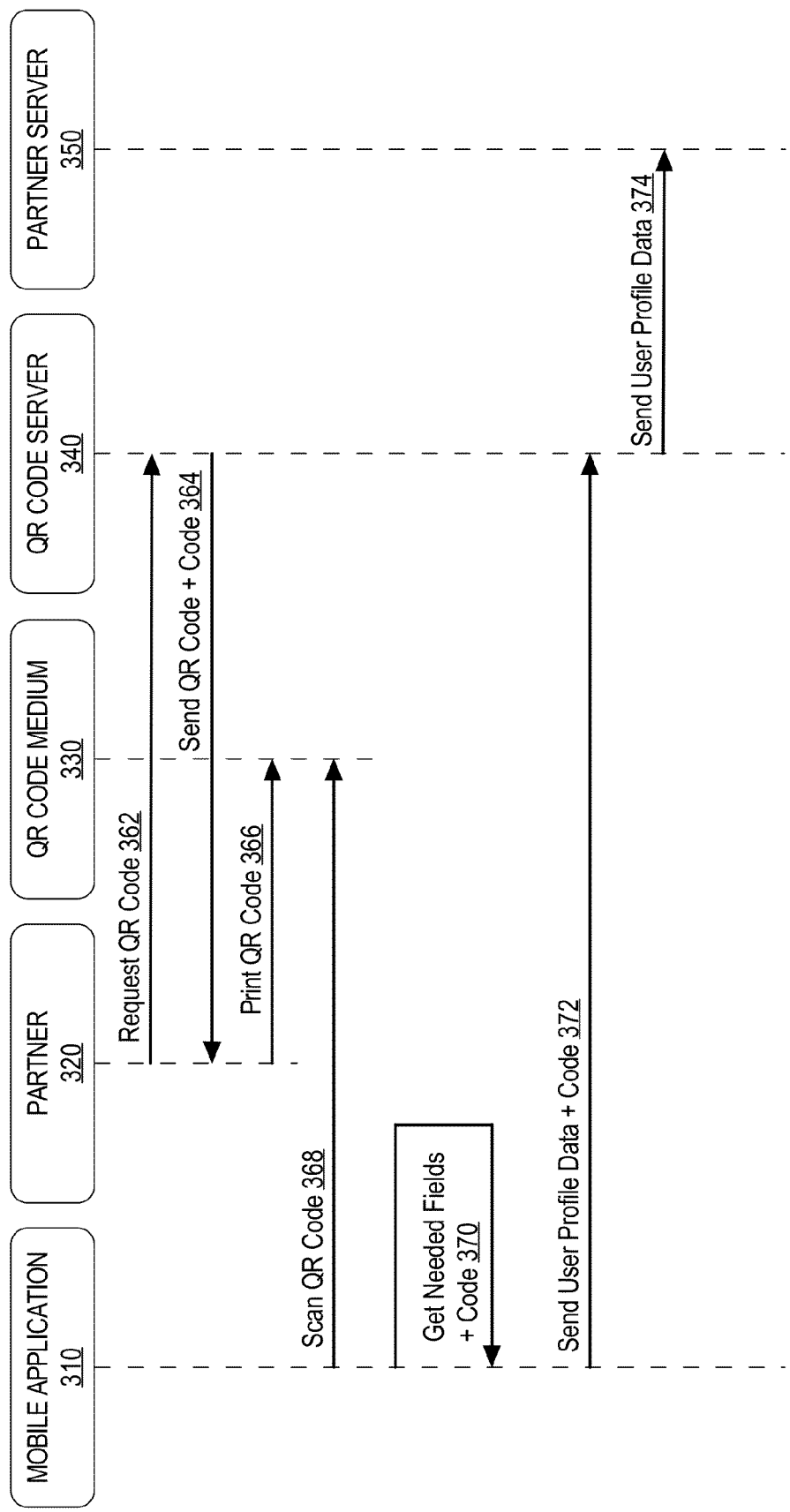
FIG. 3A is a sequence diagram that depicts a process for automatically transmitting user profile information over a network, in an embodiment.

FIG. 3A is a sequence diagram that depicts a process 300 for automatically transmitting user profile information over a network, in an embodiment. FIG. 3A is similar in some respects. FIG. 3A depicts four actors: mobile application 310, partner 320, Campaign server 340, and partner server 350.

Partner 320 is a computing device operated by a user that represents a partner (or client) of Campaign server 340. Partner 320 may be a desktop computer, a laptop computer, a tablet computer, or other mobile device. Partner 320 interacts with campaign server 340 to retrieve a QR code for a QR code campaign that partner 320 desires to initiate.

Partner server 350 may be implemented as a server that accepts data from campaign server 340 or as a client that requests data from campaign server 340. Partner server 350 may be implemented on a single computing device or multiple computing devices.

Figure 3B:
FIG. 3B depicts an example media on which a QR code may be displayed.
Figure 3B:
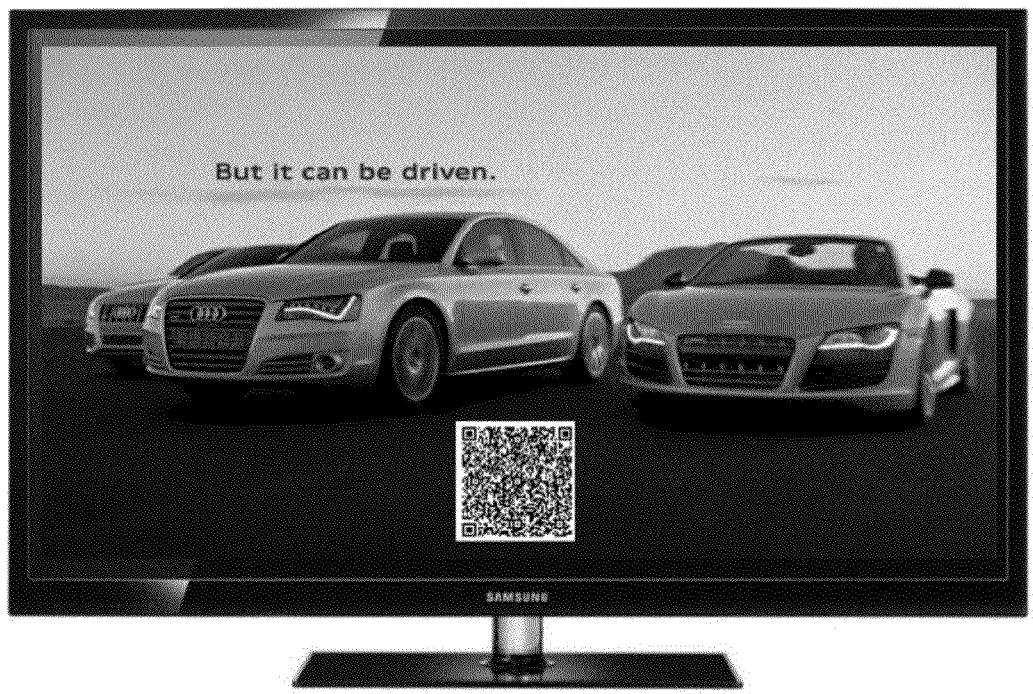

FIG. 3A also depicts a non-actor element: encoded data medium 330 on which a QR code is displayed. Example media include a television screen, a computer display screen, a flyer, a poster, and a sticker. Thus, a QR code of a fixed campaign may be displayed in an email or an MMS message. FIG. 3B depicts an example flyer 332 and a TV screen 334 with an example interface of an advertisement. Embodiments are not limited to any particular medium.

At block 362, partner 320 transmits, to campaign server 340, a request to retrieve a QR code. The request may specify which user profile data is required and/or requested. For example, the request may indicate that first name, last name, gender, email address, and birth year are required and that job title and current geographical location are only requested.

Block 362 may be preceded by partner 320 visiting a web page provided by campaign server 340 and a user of partner 320 providing input, into the web page, about user profile data items that are required or requested in order to establish a QR code campaign that campaign server 340 will support on behalf of the partner.

At block 364, campaign server 340, in response to the request, transmits, to partner 320, a QR code that encodes information about the requested/required fields and a code identifier that uniquely identifies, to campaign server 340, the QR code relative to other QR codes. The QR code may be a limited use QR code. For example, only 95 scans of the QR code (or successful transmissions of user profile data) are allowed before the associated QR campaign terminates. For example, a QR code campaign may be to register people in a rewards program where the first one hundred people who register in the rewards program using the QR code are given 1,000 reward points that may be redeemed for one or more prizes, such as a paid trip, electronics, or cash. Campaign server 340 stores scan limit data in association with one or more QR codes that indicates, for each of the one or more QR codes, a number of registrations, a time period, or other termination criteria that indicates when scans of the QR code (or registrations using the QR code) are no longer allowed. (Campaign server 230 may also store scan limit data or QR code campaign termination criteria that indicates when QR codes of a QR code campaign will no longer be created or when receipts of user profile data using the QR codes will no longer be accepted.)

At block 366, partner 320 (or one or more separate computing devices) causes the QR code to be printed or displayed on encoded data medium 330. For example, the QR code may be printed on a flyer or a poster. As another example, the QR code may be inserted in digital displays of a web pages or advertisements.

At block 368, mobile application 310 scans the QR code that is printed or displayed on encoded data medium 330.

At block 370, mobile application 310 identifies the requested fields and code identifier encoded in the scanned QR code.

At block 372, mobile application 310 identifies user profile data based on the requested fields and transmits the user profile data and the code identifier to campaign server 340. Campaign server 340 uses the code identifier to associate the user profile data received from mobile application 310 with the QR code, which is associated with partner server 350 or other data that identifies the partner or client that initiated the QR code campaign associated with the QR code.

Block 372 may be preceded by a privacy check, similar to the one in block 262 of FIG. 2A.

At block 374, campaign server 340 sends, to partner server 350, the user profile data received from mobile application 310. Campaign server 340 may send the user profile data immediately upon receipt of the user profile data and determination that the user profile data is associated with partner server 350. In this scenario, partner server 350 implements a web service in order to collect user profile data from campaign server 340. In a related scenario, campaign server 340 stores user profile data of one or more users and sends the user profile data, for example, every ten minutes or every five user submissions. In an alternative scenario, campaign server 340 stores the user profile data in association with the QR code or the partner and waits for partner server 350 (or client device) to send a request for the user profile data. When partner server 350 requests user profile data, campaign server 340 may send user profile data of multiple users.

Storing Scan History

In an embodiment, a mobile application (e.g., mobile application 210) stores scan history data that indicates information about one or more scans that were performed previously by the mobile application. The scan history data may include, for each QR code scan, the partner (e.g., individual or company) that initiated the QR code campaign, a name associated with the QR code campaign (which name may be encoded in the QR code), the fields (or user profile data item types) that were required or requested, the date and/or time on which the QR code scan occurred, a geographic location where the scan occurred (e.g., a city, a zip code, or geographic coordinates), and a password that a user of the mobile application may need to provide along with his/her profile data when, for example, registering for a rewards program, a contest, or a discount. Some partners may require a password during registration, in which case, the mobile application determines that requirement and automatically generates a password. Thus, the mobile application may store the generated password in association with the campaign so that the user can later locate the password. Alternatively, the mobile application may prompt the user to provide the password, after which the mobile application stores the user-provided password in association with the campaign.

The mobile application may provide a user interface to allow a user to view a list of previous scans (which may be ordered based on date), select any of the previous scans, and view the details of any previous scan. Thus, a user is allowed to know what, where, when, and to which organization/partner the user allowed his/her profile to be sent.

Customizable QR Codes

Figure 4:
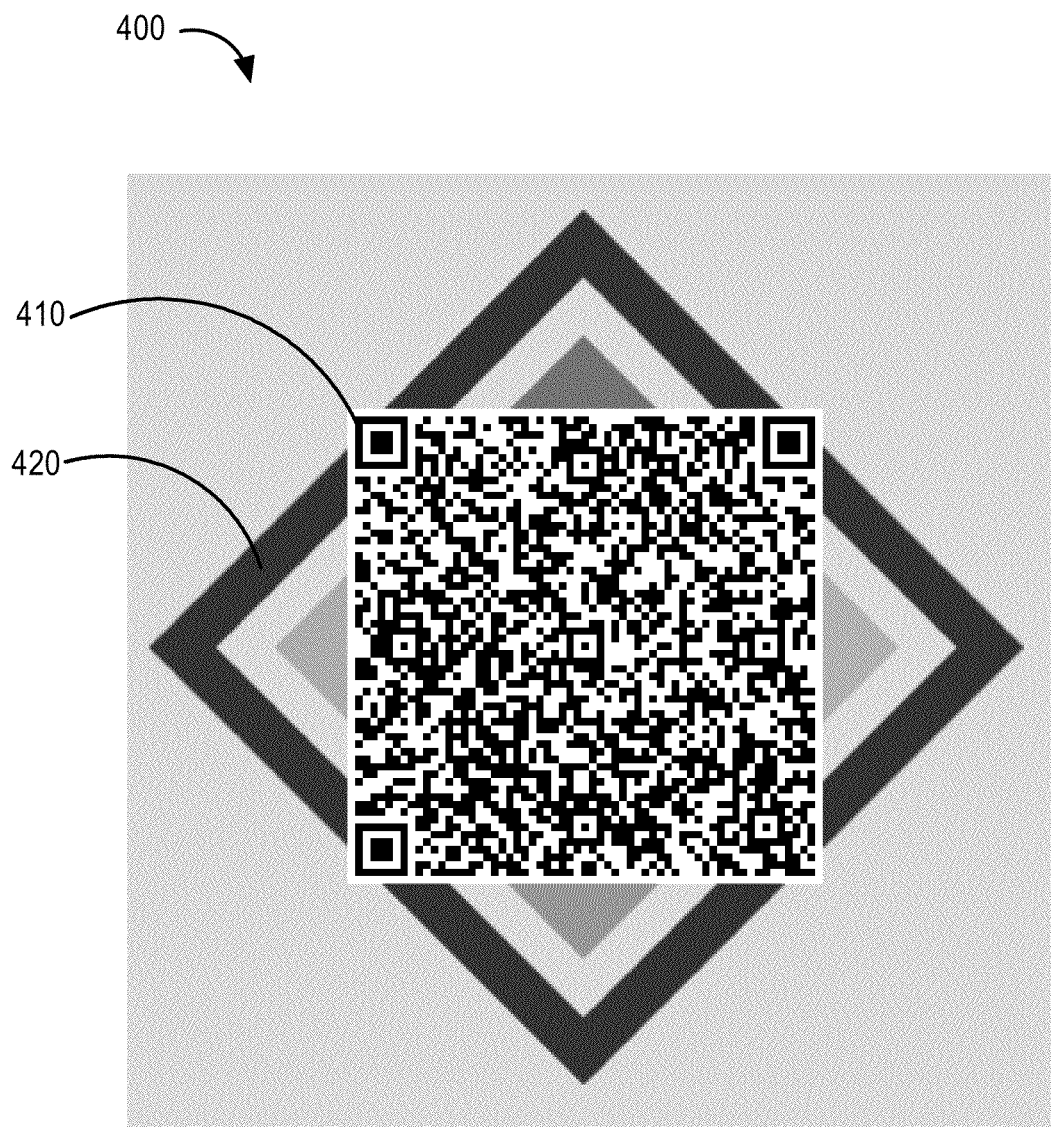
FIG. 4 depicts an example customized QR code, in an embodiment.

In an embodiment, a partner or client of the provider of QR codes is able to customize one or more QR codes for a QR code campaign. Through a user interface, a partner may add a logo to the QR code, change the color and sign of the QR code, add text, etc. FIG. 4 depicts an example customized QR code 400, which includes QR code 410 and background design 420. In the first scenario where each QR code of a single QR code campaign may be different, each QR code may include the same customized features even though the actual QR code is different.

Importing User Profile Data

A mobile application (e.g., mobile application 310) that is configured to communicate with a provider of QR codes (e.g., campaign server 340) may provide a user interface that allows a user to manually specify user profile data for each of multiple types of user profile data. The manually-inputted user profile data (or a portion thereof) will be transmitted to a Campaign server.

Figure 5A:
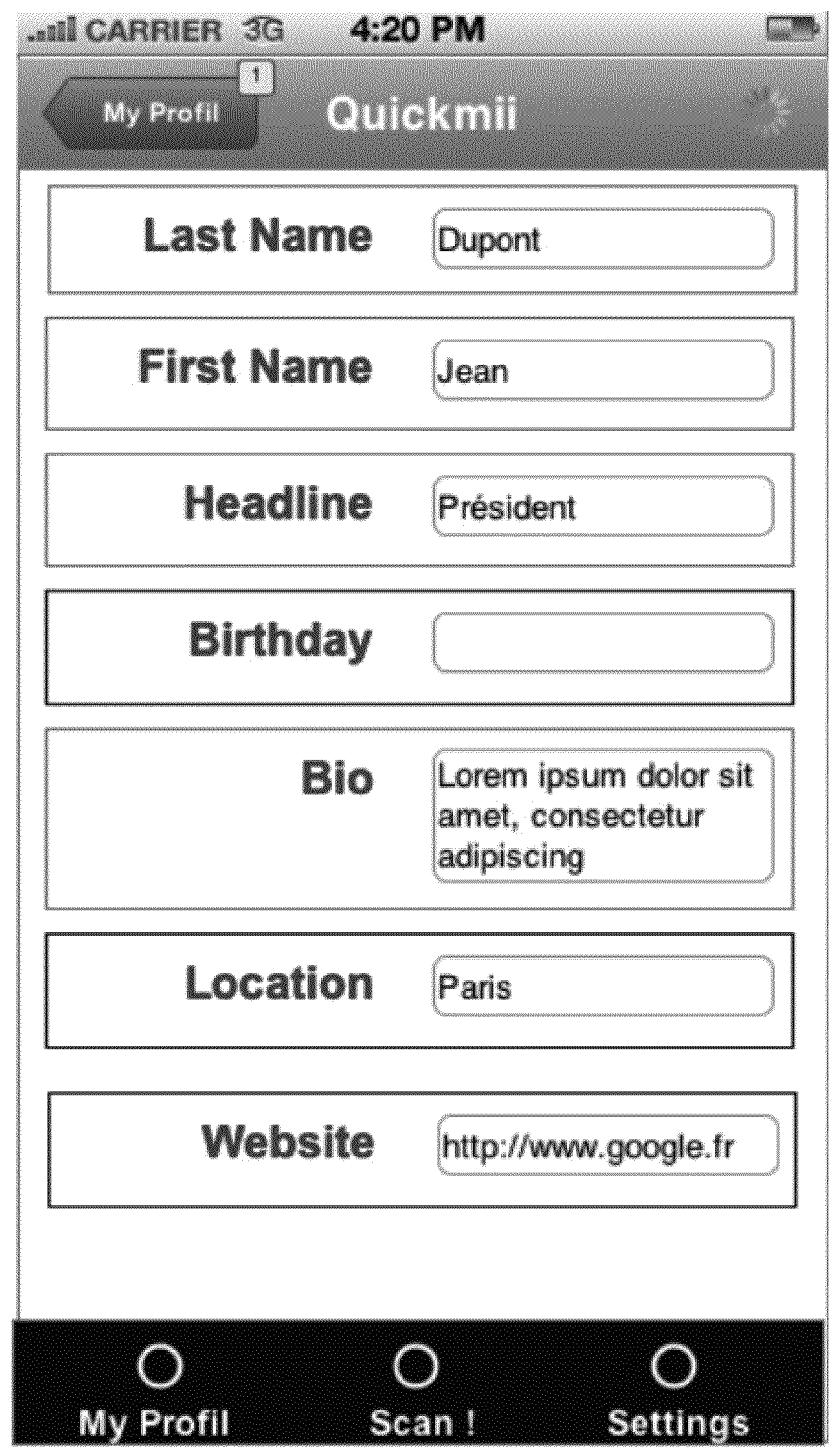
FIGS. 5A-5T depict example interfaces of a mobile application that scans QR codes.

FIG. 5A depicts an example interface 502 of a user interface of the mobile application. The user interface includes multiple fields in which a user may input user profile information, whether through selecting characters on digital keyboard or providing audio input that is analyzed and converted to text. In example interface 502, user profile data items include last name, first name, headline (or job title), birthday, biography data, location, and website. In this example, a user has not filled in all the available fields.

Additionally or alternatively, user profile data (or a portion thereof) is imported into the mobile application. In this way, entry of user profile data is simplified for users. For example, user profile data stored by one or more social networks may be imported to the computing device upon which mobile application executes. Example social networks include Facebook, LinkedIn, Google+, Twitter, and Viadeo. User profile information may be imported from one or more social networks using REST (Representational state transfer), SOAP (Simple Object Access Protocol), and/or Open Graph.

Figure 5B:
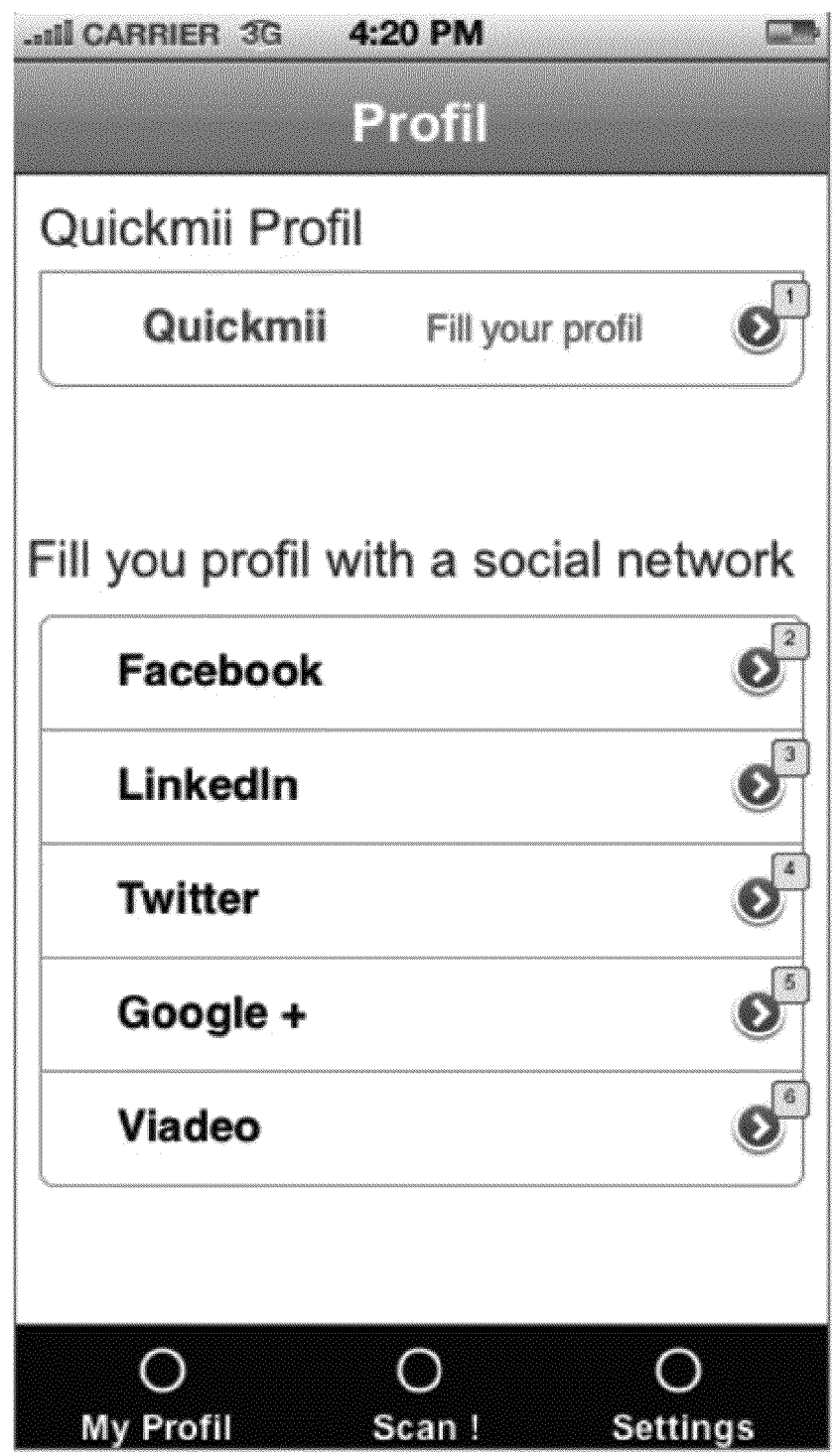

FIG. 5B depicts an example interface 504 of a user interface that allows a user to view his/her profile and select a social network from which to import user profile data. Interface 504 also indicates that one or more fields are not filled in.

Figure 5C:
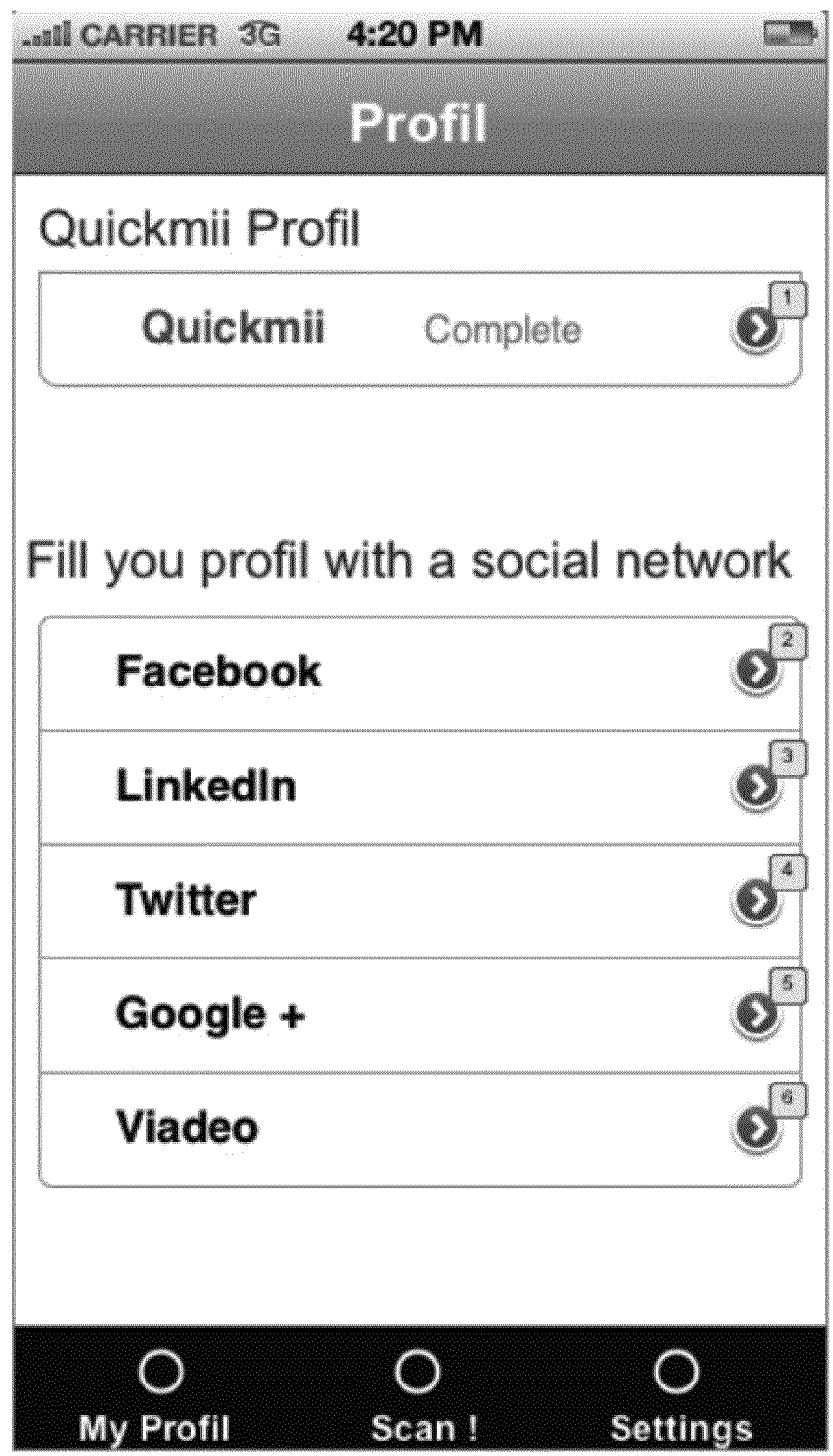
Figure 5D:
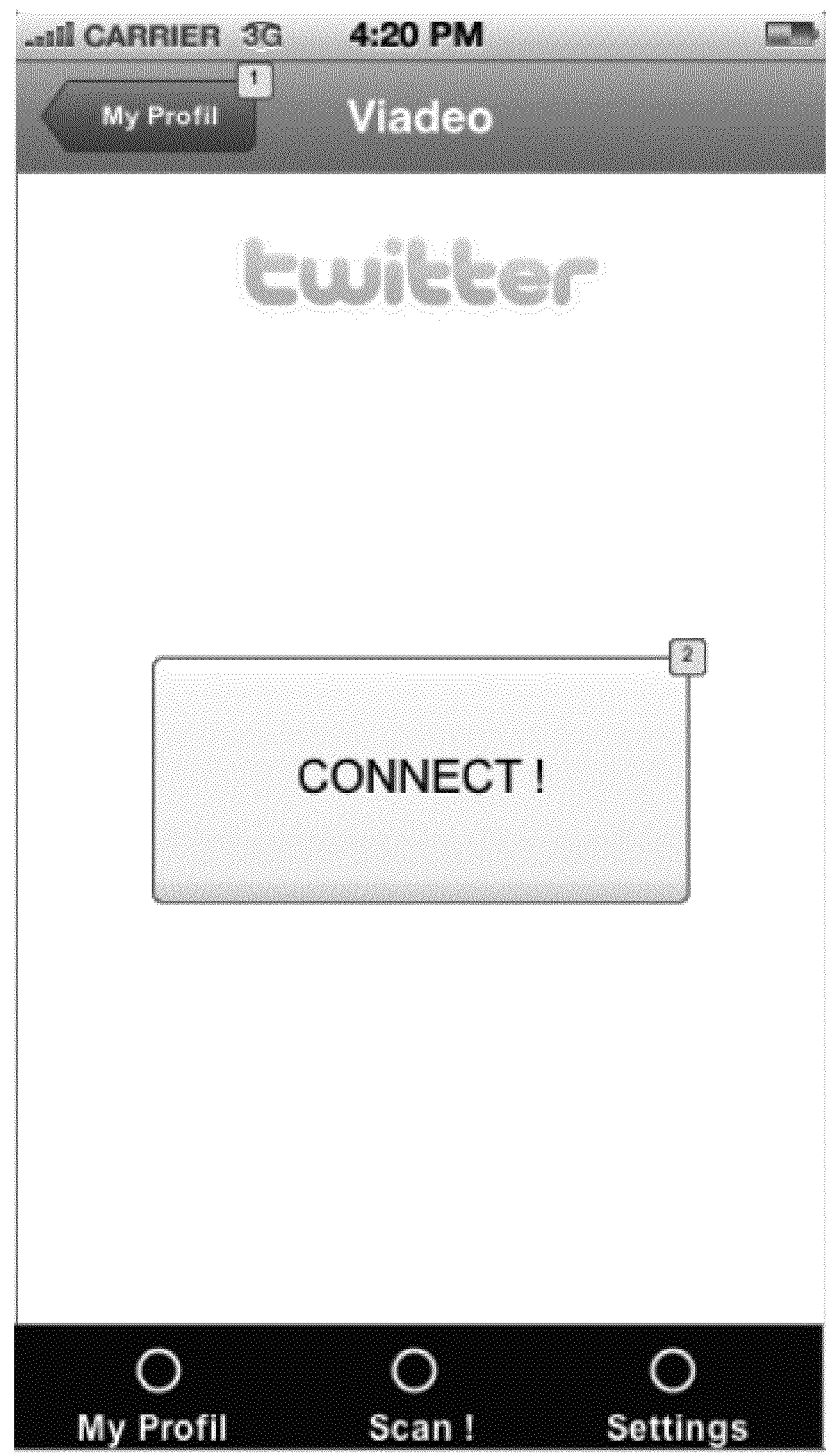
Figure 5E:
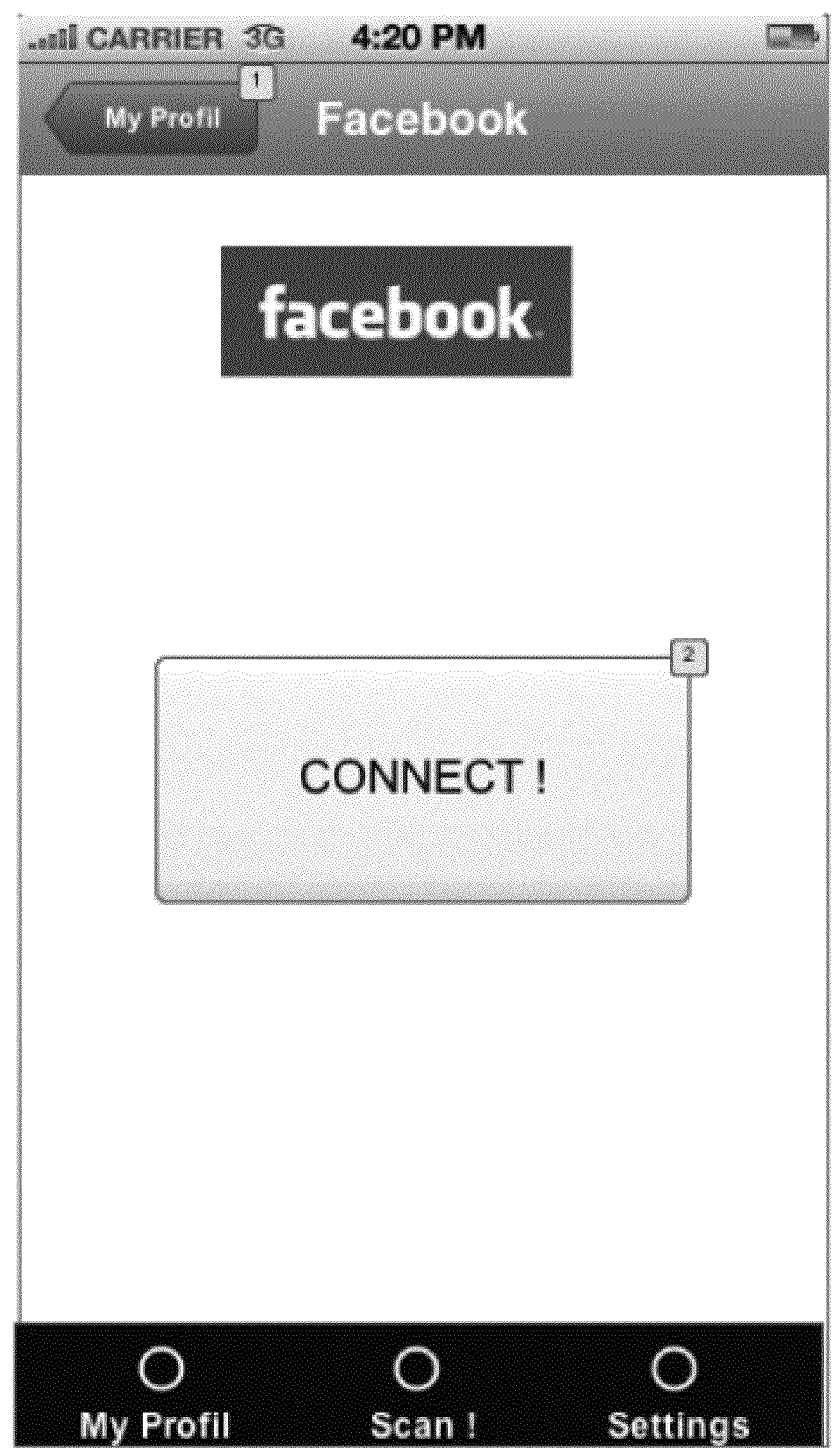
Figure 5F:
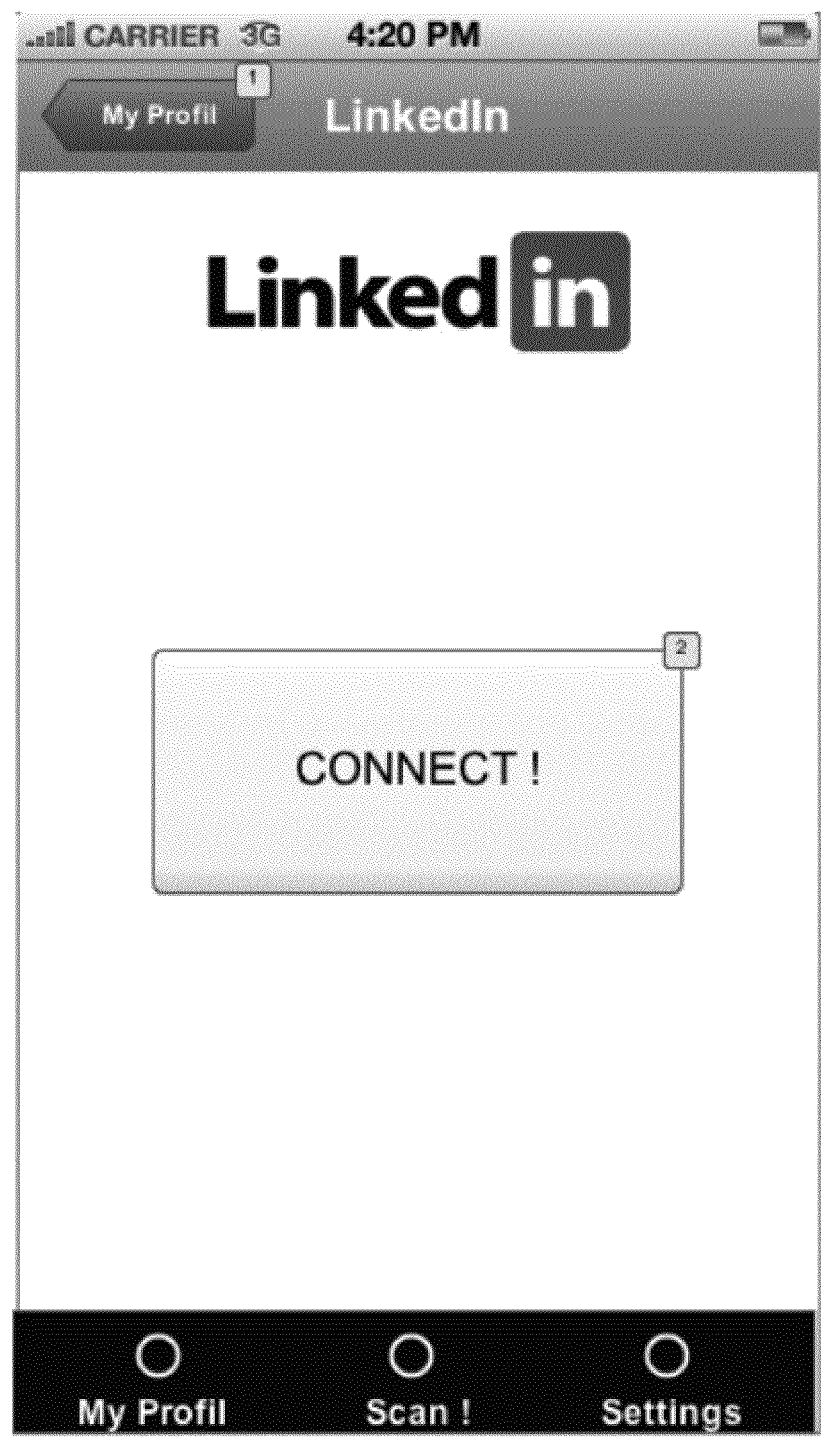
Figure 5G:
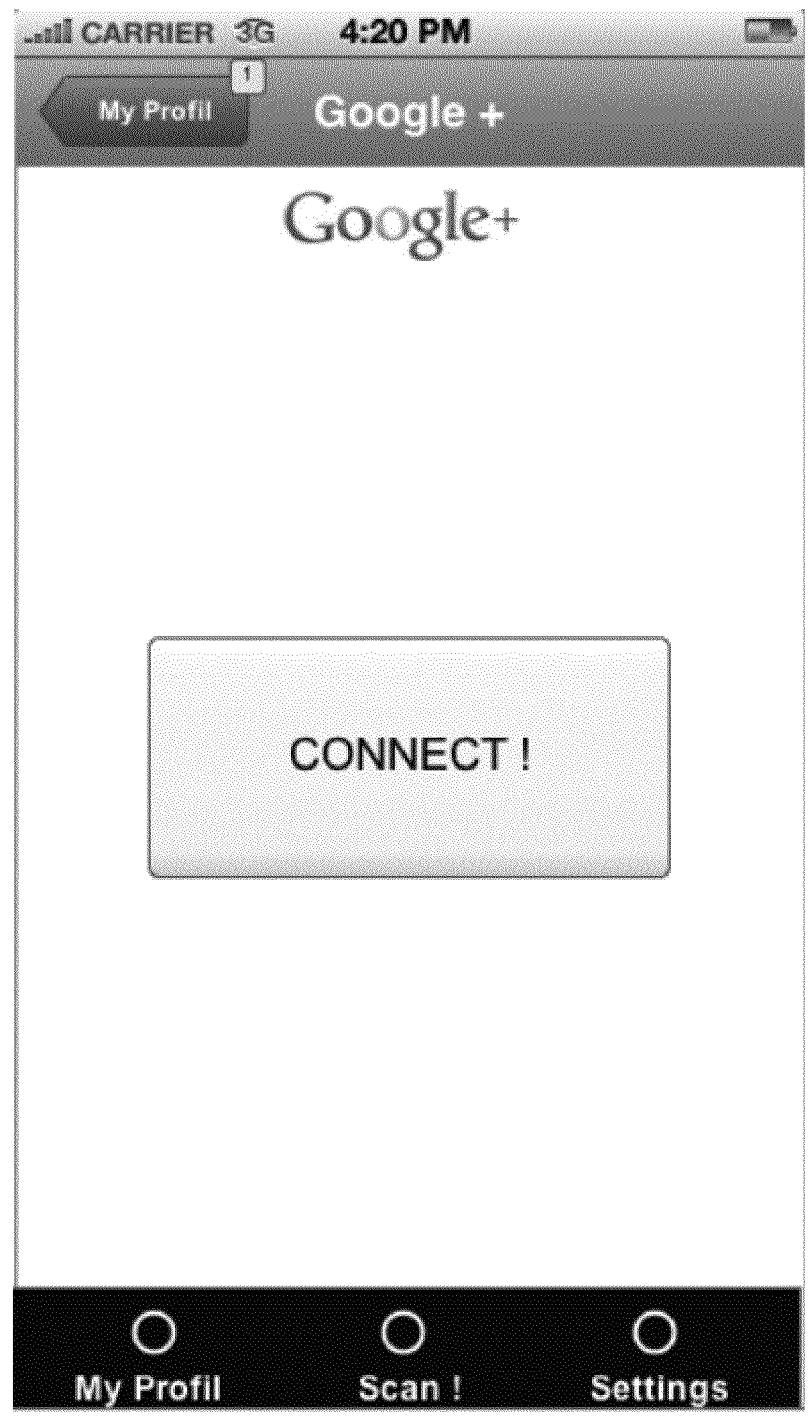

FIG. 5C depicts an example interface 506 that is similar to interface 504 except that interface 506 indicates that the user's profile is complete, i.e., all available fields have been filled in.

FIGS. 5D-5G depict example interfaces 508-514, respectively, each interface generated based on user selection of one of the social network buttons of interface 504 or 506. Each of interfaces 508-514 displays a button to allow the mobile application to connect to the corresponding social network, view and retrieve user profile data from the social network, and (optionally) merge with existing profile data stored on the user's device.

Figure 5H:
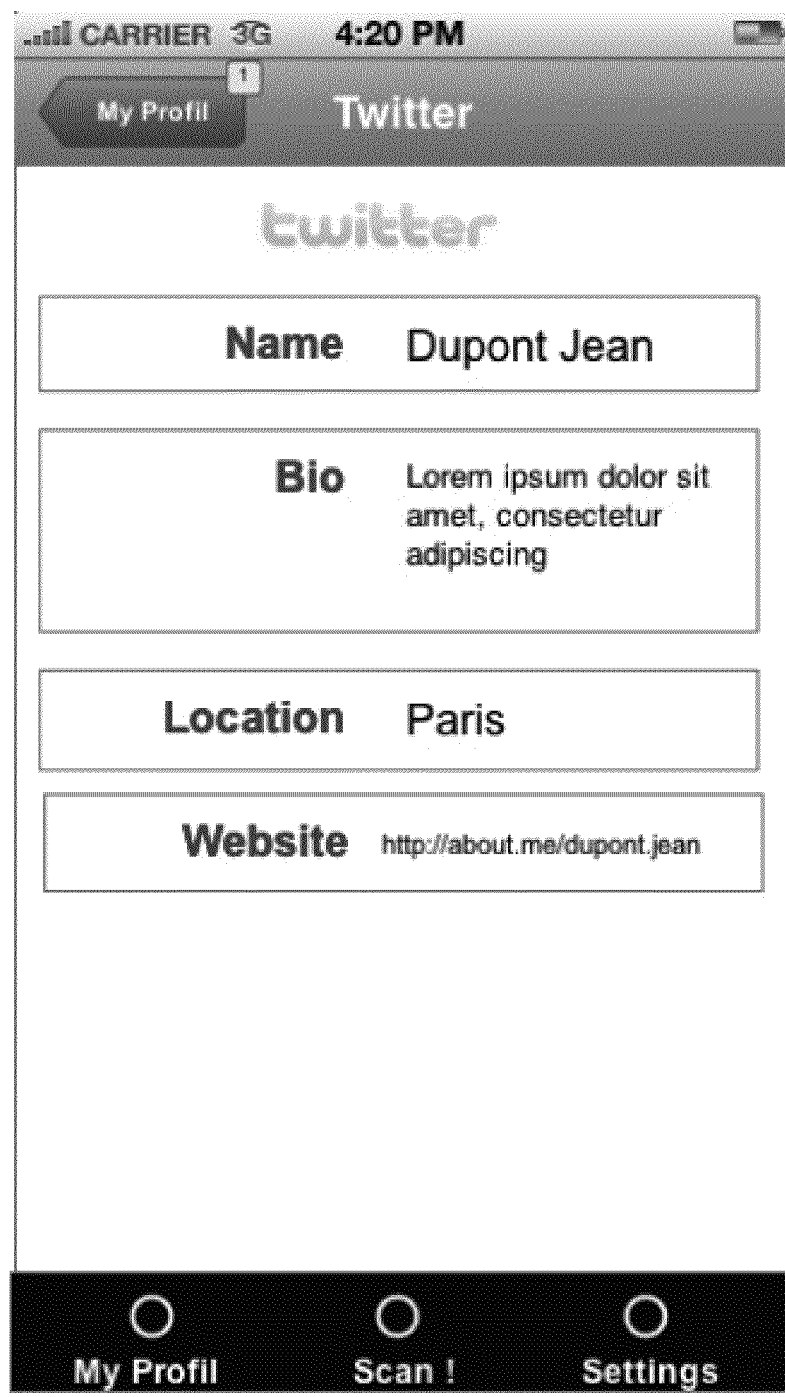
Figure 5I:
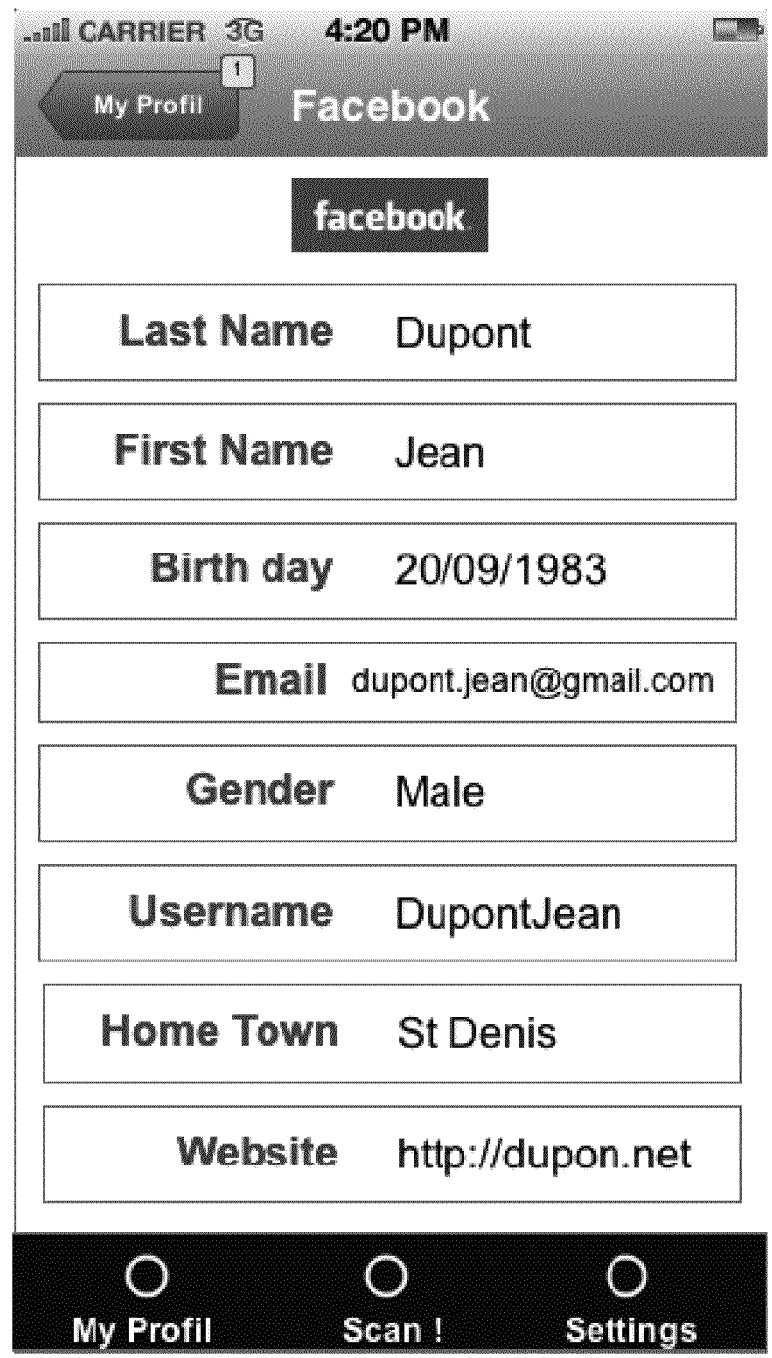
Figure 5J:

FIGS. 5H-5J depict example interfaces 516-520, respectively, each interface generated based on user selection of one of the buttons of interface 508, 510, or 512. Each of interfaces 516-520 displays user profile data maintained by a different social network provider.

Figure 5K:
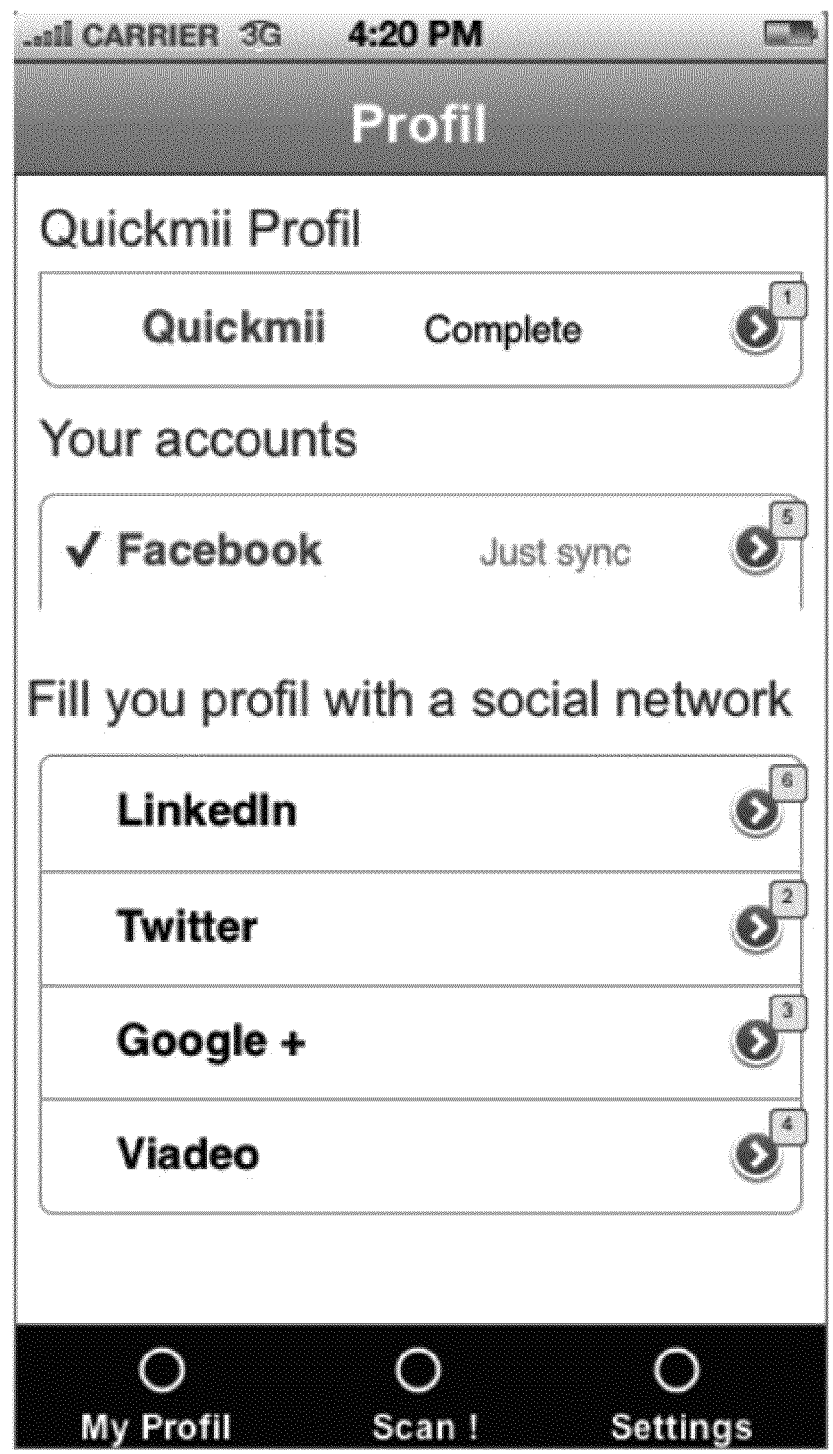

FIG. 5K depicts an example interface 522 that indicates that the user profile data from one social network was recently synced with existing user profile data from that social network.

Figure 5L:

FIG. 5L depicts an example interface 524 that includes a user's profile data as maintained on the user's mobile device. Interface 524 indicates, for each of multiple profile data items, the social network from which the profile data item was retrieved. In this example, each of the five user profile data items came from a single social network provider.

Profile Data Conflicts

In an embodiment, a mobile application identifies conflicts between corresponding user profile data items. If multiple social networks are used to import user profile data, then one or more conflicts may exist. For example, if a birthday indicated in user profile data from social network A is different than a birthday indicated in user profile data from social network B, then a conflict exists. (A conflict may also exist between a user profile data item inputted by a user of the mobile application and a corresponding imported user profile data item.) The mobile application determines that a conflict exist by comparing corresponding user profile data items (e.g., two birthday dates or two job titles). The mobile application may then notify a user of a conflict through one or more notifications, such as an audible notification or a visual notification. In this way, the user is apprised of the conflict and is able to address the conflict by selecting or inputting the correct information.

Figure 5M:
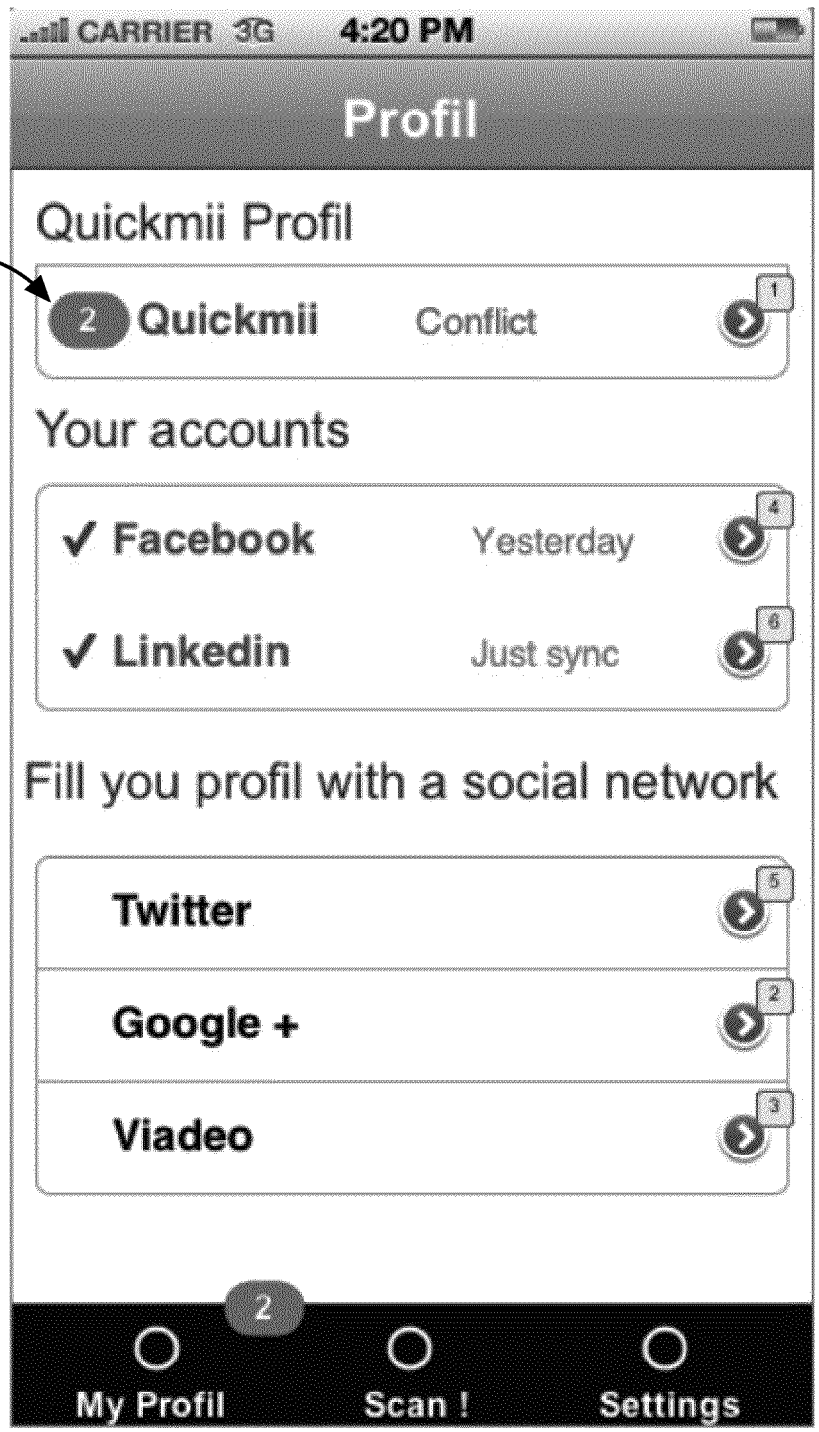

FIG. 5M depicts an example interface 526 that includes a conflict notification 527 and a number that indicates the number of conflicts identified by the mobile application.

Figure 5N:
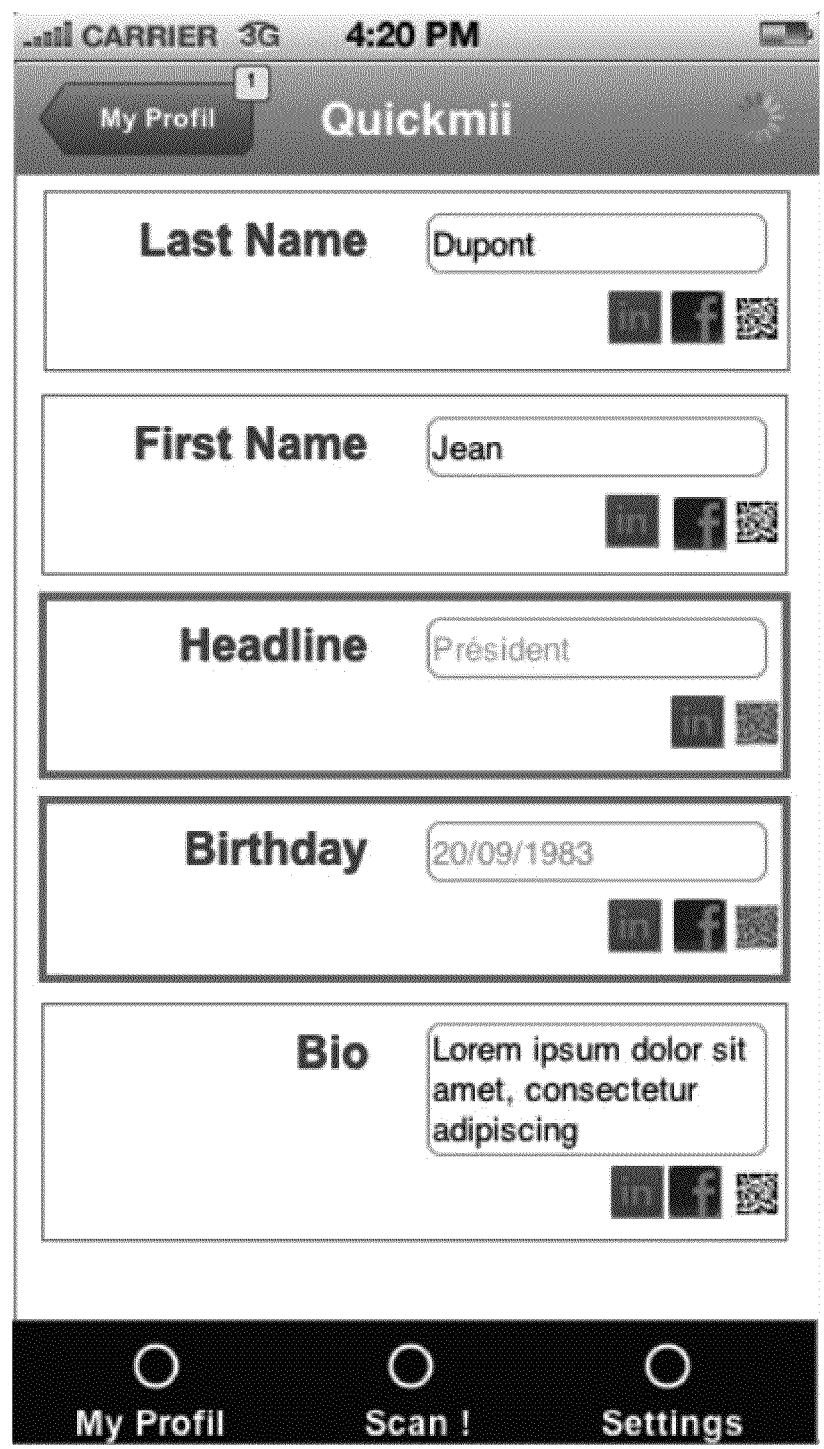

FIG. 5N depicts an example interface 530 that indicates five user profile data items, two of which are highlighted to indicate that a conflict exists with respect to those two profile data items. Interface 530 may be displayed in response to user selection of button 529 in interface 526. In the example of interface 530, the headline (or job title) and birthday fields are highlighted, indicating two conflicts.

The mobile application that imports user profile data from multiple social networks may visually indicate, for each user profile data item, which social networks provided data pertaining to that user profile data item. In the example of interface 530, four of the five displayed profile data items are associated with social network identification data that indicates, through logos, two social networks from which the profile data items originate.

Based on the conflicts indicated in interface 530, it can be deduced that a first conflict exists between LinkedIn and the user's input and a second conflict exists between Facebook and LinkedIn.

Import Times

In an embodiment, the mobile application maintains time data that indicates when an import of user profile data occurred and/or when a manual input of user profile data occurred. For example, if an import from social network A occurred on a particular date and time, then that particular date and time are stored in association with the imported user profile data. The time data may be used by a user of the mobile application to quickly determine which information is more accurate. Additionally or alternatively, the time data may be used by the mobile application as a tie-breaker. For example, if the job title information from social network A is associated with a later import date relative to the job title information from social network B, then the mobile application selects the job title information from social network A as the most accurate or relevant job title for the user's profile.

Figure 5O:
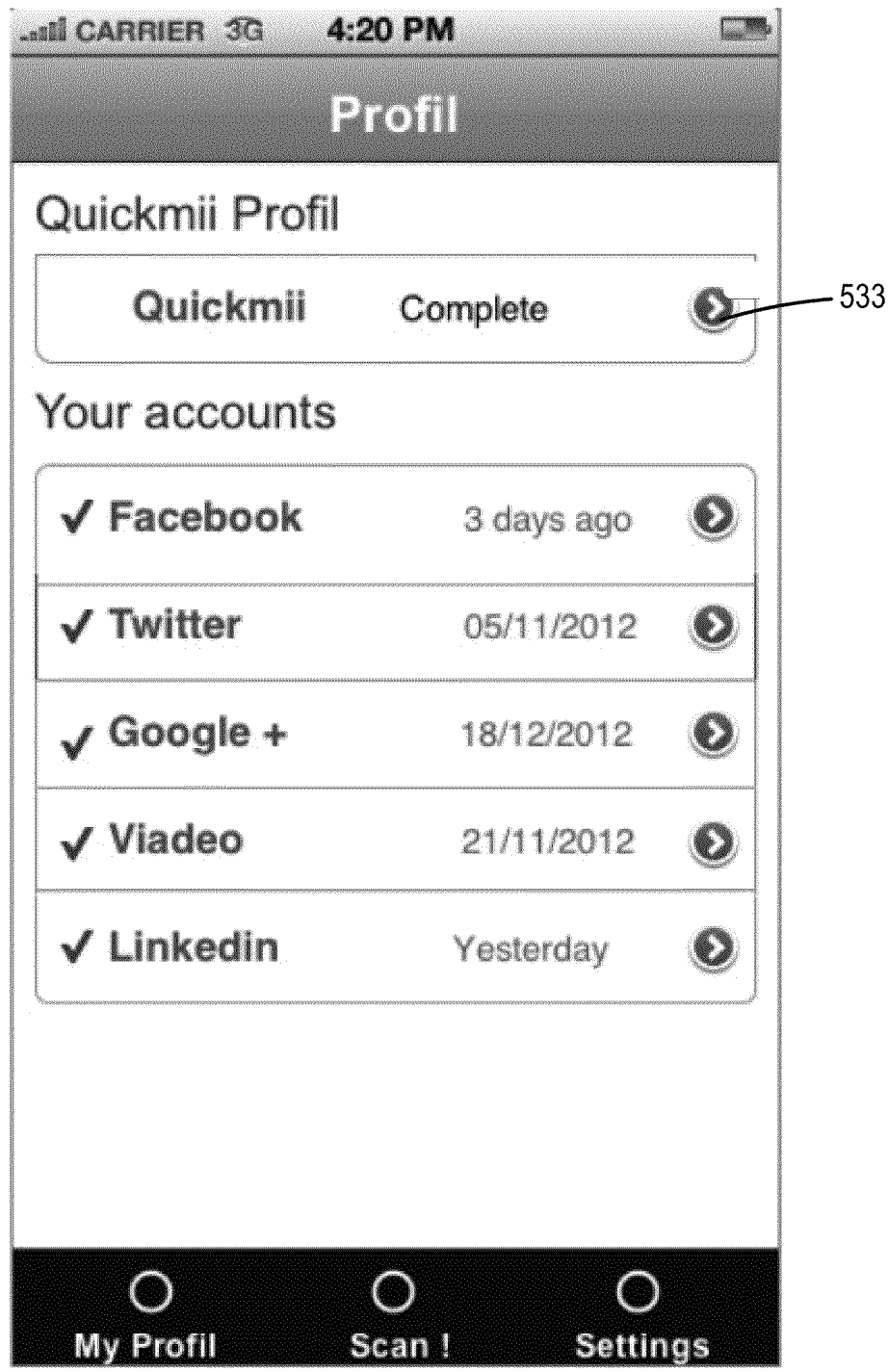

FIG. 5O depicts an example interface 532 that displays date or time data regarding the import of user profile data from each of multiple social networks. In this example, user profile data from Facebook was imported three hours from the current time. Also, user profile data from Twitter occurred on May 11, 2012.

Figure 5P:
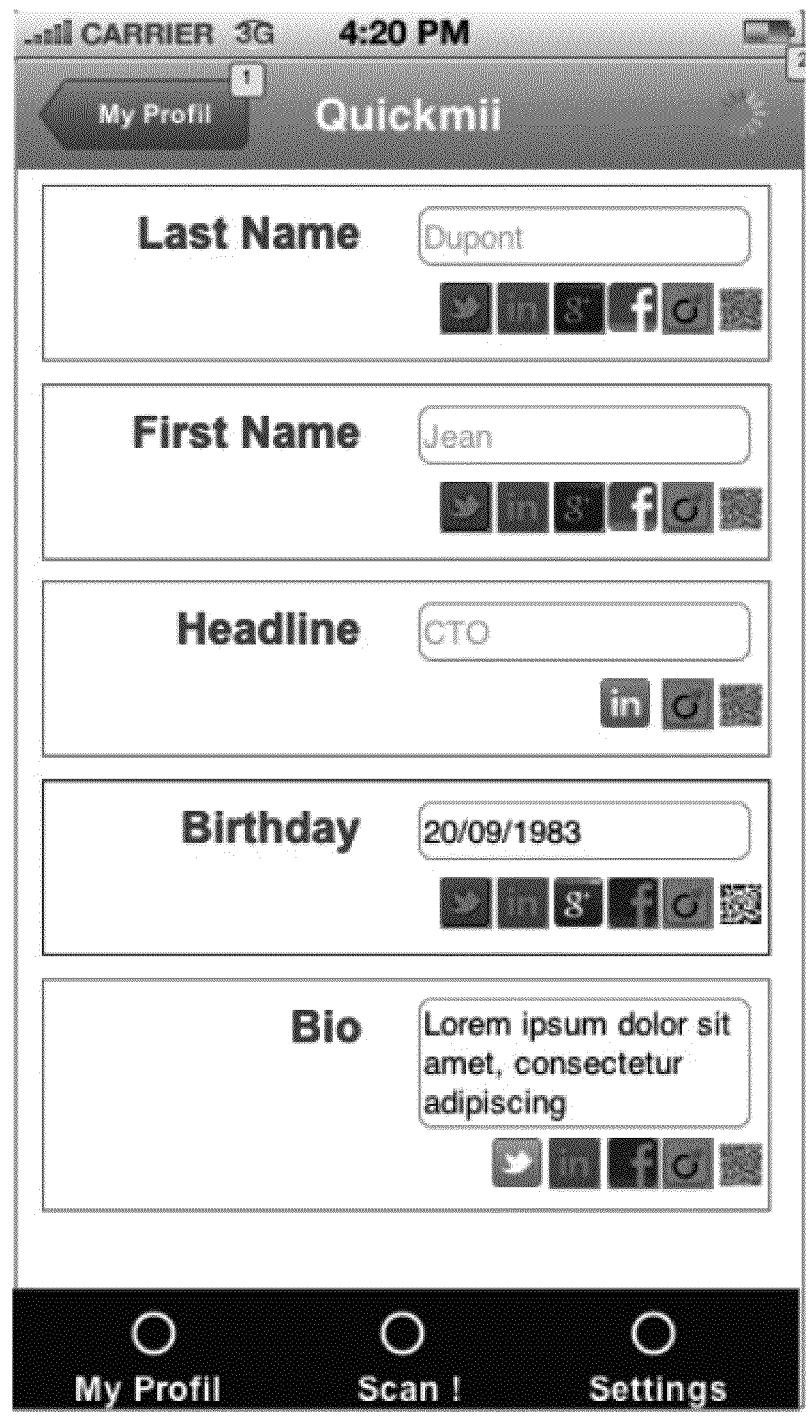

FIG. 5P depicts an example interface 536 that indicates multiple profile data items that are maintained by the mobile application. In this example, three of the profile data items indicate that the corresponding profile data item was retrieved from five different social network providers. Interface 536 may be displayed in response to user selection of button 533 displayed in interface 532.

Mobile Settings

In an embodiment, the mobile application that is configured to decode the requested/needed fields from QR codes provides security and/or privacy with respect to a user's profile data.

Figure 5Q:

FIG. 5Q depicts an example interface 538 that indicates multiple settings that a user may set with respect to his/her profile data. Those settings include security, privacy, and notifications.

Figure 5R:
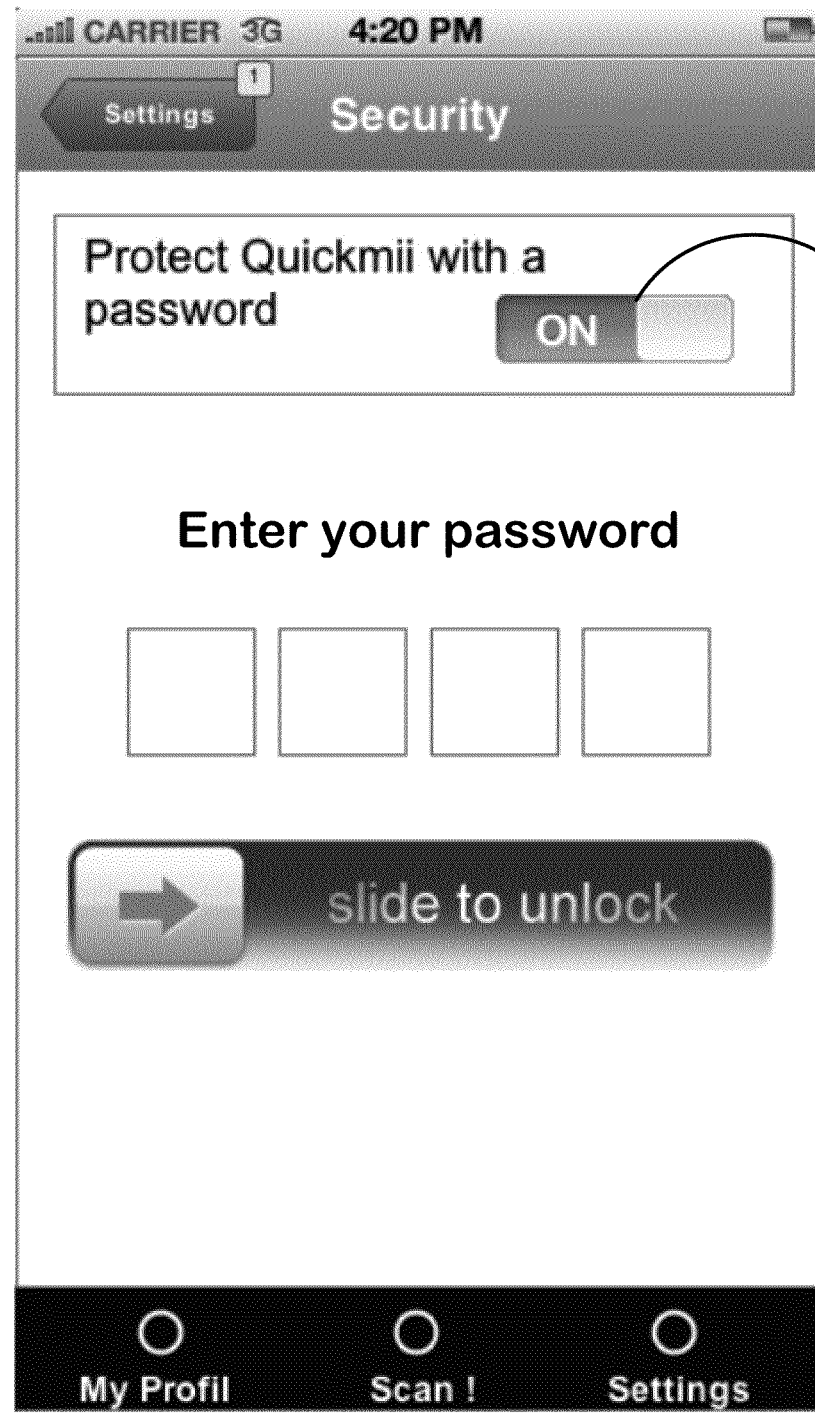

FIG. 5R depicts an example interface 540 that may be generated by user selection of the security button 539 included in interface 538. Interface 540 includes a button 541 that turns profile security on or off. If security is turned on, then a user must provide a password (or other input, such as a design swipe) that is required to view the user profile data.

Figure 5S:
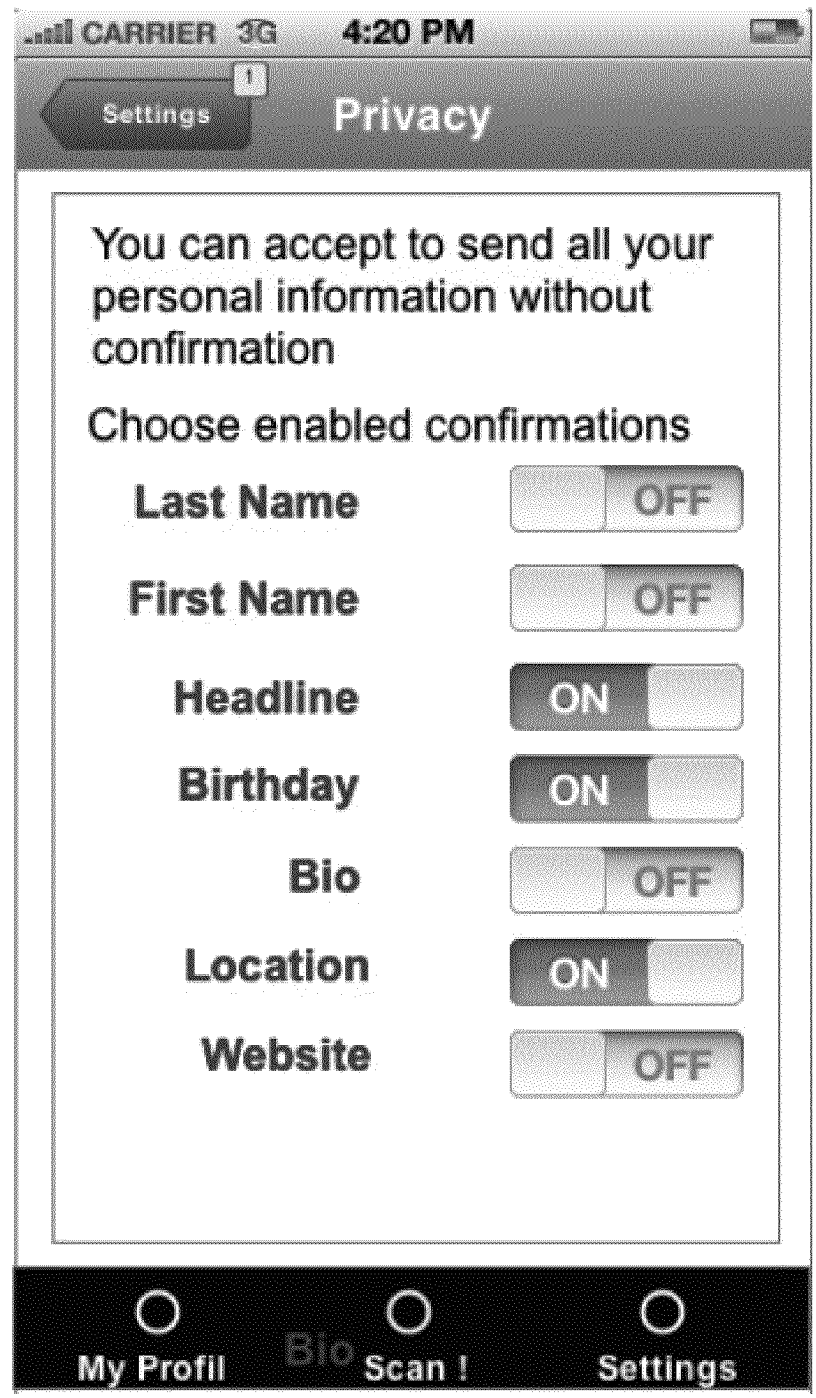

FIG. 5S depicts an example interface 542 that depicts privacy settings for each of multiple user profile data items. If privacy is set with respect to a particular profile data item, then that data item will not be automatically transmitted to a campaign server in response to the mobile application scanning a QR code. The privacy settings may be used as part of a privacy check described previously (e.g., block 262 of FIG. 2A). In interface 542, privacy is set with respect to the user's headline, birthday, and current location.

If an "ON" button is displayed adjacent to a profile data item type (e.g., "Headline" in FIG. 5R), then a manual confirmation is required to allow the corresponding profile data item to be transmitted to a campaign server. If a scanned QR code indicates that one or more of those profile data items are required or requested, then the mobile application may first notify the user of the privacy setting and prompt for user input to (a) allow the one or more profile data items to be transmitted to a Campaign server or (b) terminate the process so that the one or more profile data items are not transmitted to a Campaign server. In interface 542, manual confirmation is enabled with respect to the user's headline, birthday, and current location.

Conversely, if an "OFF" button is displayed adjacent to a profile data item type (e.g., "Last Name" in FIG. 5R), then a manual confirmation is not required to allow the corresponding profile data item to be transmitted to a campaign server. Thus, if no manual confirmations are enabled, then a user's profile data may be sent automatically to a Campaign server without requiring any input from the user. In interface 542, manual confirmation is not enabled with respect to the user's first and last names, biography, and website.

If a user selects the "ON" button of a profile data item type, then manual confirmation with respect to the corresponding profile data item will be disabled. Conversely, if a user selects the "OFF" button of a profile data item type, then manual confirmation with respect to the corresponding profile data item will be enabled.

In an embodiment, a campaign server (e.g., campaign server 230) does not persistently store user profile information. Instead, the Campaign server deletes user profile data received from a mobile application as soon as (or shortly after) the user profile data is (a) filled into a form or (b) transmitted to a partner server (e.g., partner server 350). In this way, the only persistent copies of a user's profile data is stored on the user's device (which may be secured with one or more layers of protection) and on one or more partner servers.

In an embodiment, if a partner manually exports, from a campaign server, user profile data pertaining to one or more campaigns, then the campaign server stores the user profile data persistently, at least until the user profile data is exported. Until then, the user profile data (or a portion thereof, such as first and last names and birthdays) may be encrypted by the Campaign server.

In an embodiment, if a partner desires to use a push mechanism to send messages to (e.g., women only) end-users of the partner's campaigns, then the Campaign server stores user profile data persistently, even if the partner implements a callback web service that the campaign server uses upon receipt of user profile data.

Figure 5T:

FIG. 5T depicts an example interface 544 that indicates whether the mobile application will generate certain notifications. In the depicted example, the conflict notification is enabled. Thus, the mobile application will generate an alert when a conflict occurs. Also in the depicted example, the mobile application will generate an alert when a Facebook friend/contact of the user installs the mobile application.

Partner Interface

In an embodiment, a provider of QR codes provides an interface that allows partners or clients to create QR code campaigns and interact with users who have scanned their respective QR codes. The interface may be a web interface that is accessible to any web-enabled computing device.

Figure 6A:
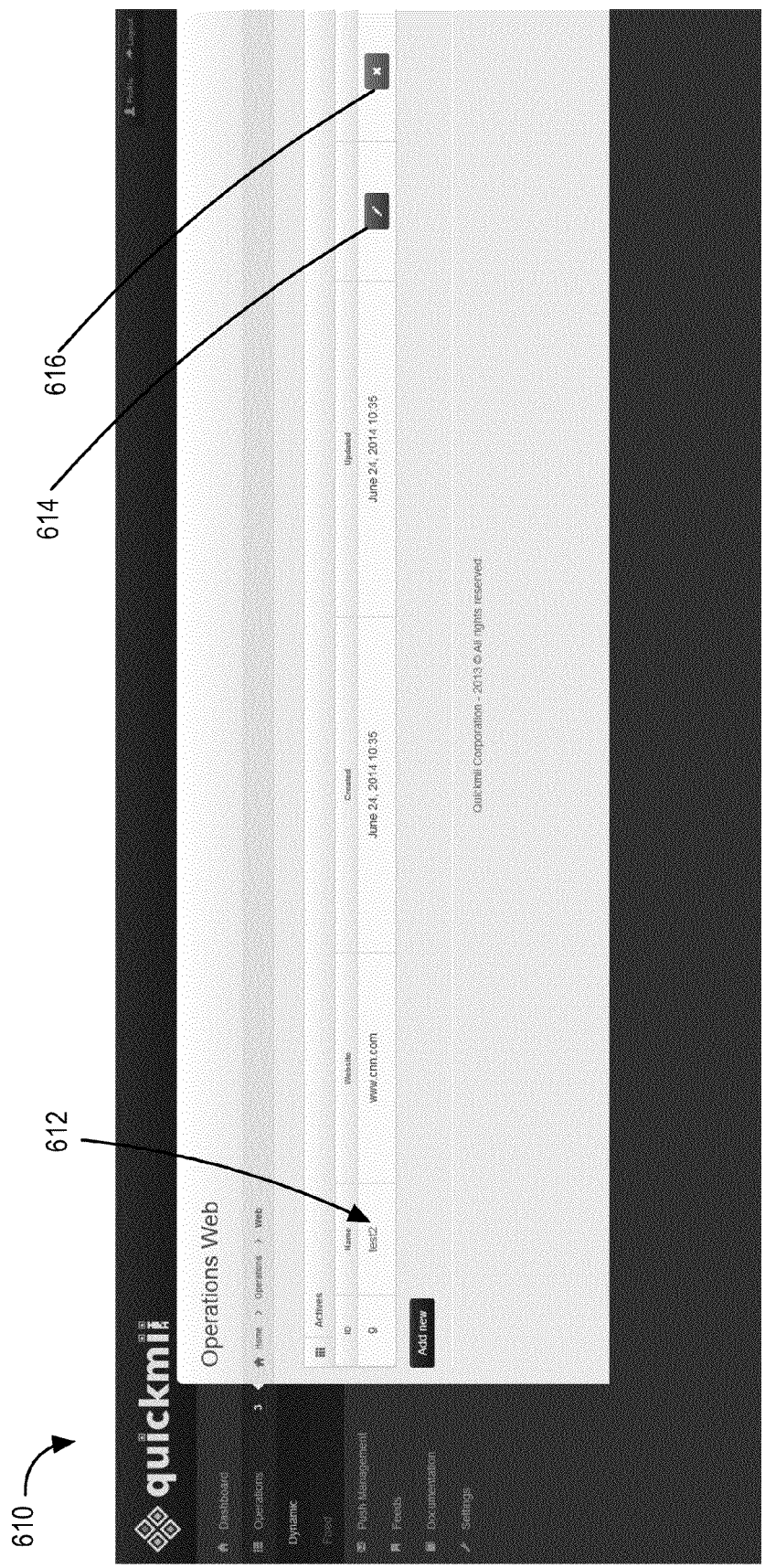

FIG. 6A depicts an example interface 610 that allows a user to create a new QR code campaign and view details of existing QR code campaigns. The user may be an individually user who, for example, desires to sell his/her car or a representative of a commercial entity that desires to entice people to sign up for a rewards programs. In the left pane of interface 610, the interface allows a user to create a dynamic QR code campaign or a fixed QR code campaign. A dynamic QR code campaign is one where each QR code of a single QR code campaign is different. A fixed QR code campaign is one where a single QR code is used throughout a single QR code campaign. Thus, a user may create one or both types of campaigns.

In interface 610, one dynamic campaign (or "operation") is displayed. Each dynamic campaign has certain attributes, including a name, a website on which the corresponding QR code is found, a creation date, and an update date (if one exists). In this example, selection of the name of an existing dynamic campaign (i.e., "test2") causes interface 612 to be displayed.

In this example, the name of the campaign is "test2," the website on which a form with the corresponding QR code is found is www.cnn.com, the creation date of the QR code campaign was Jun. 24, 2014, and the latest update date (if there are more than one) is also Jun. 24, 2014.

Figure 6B:
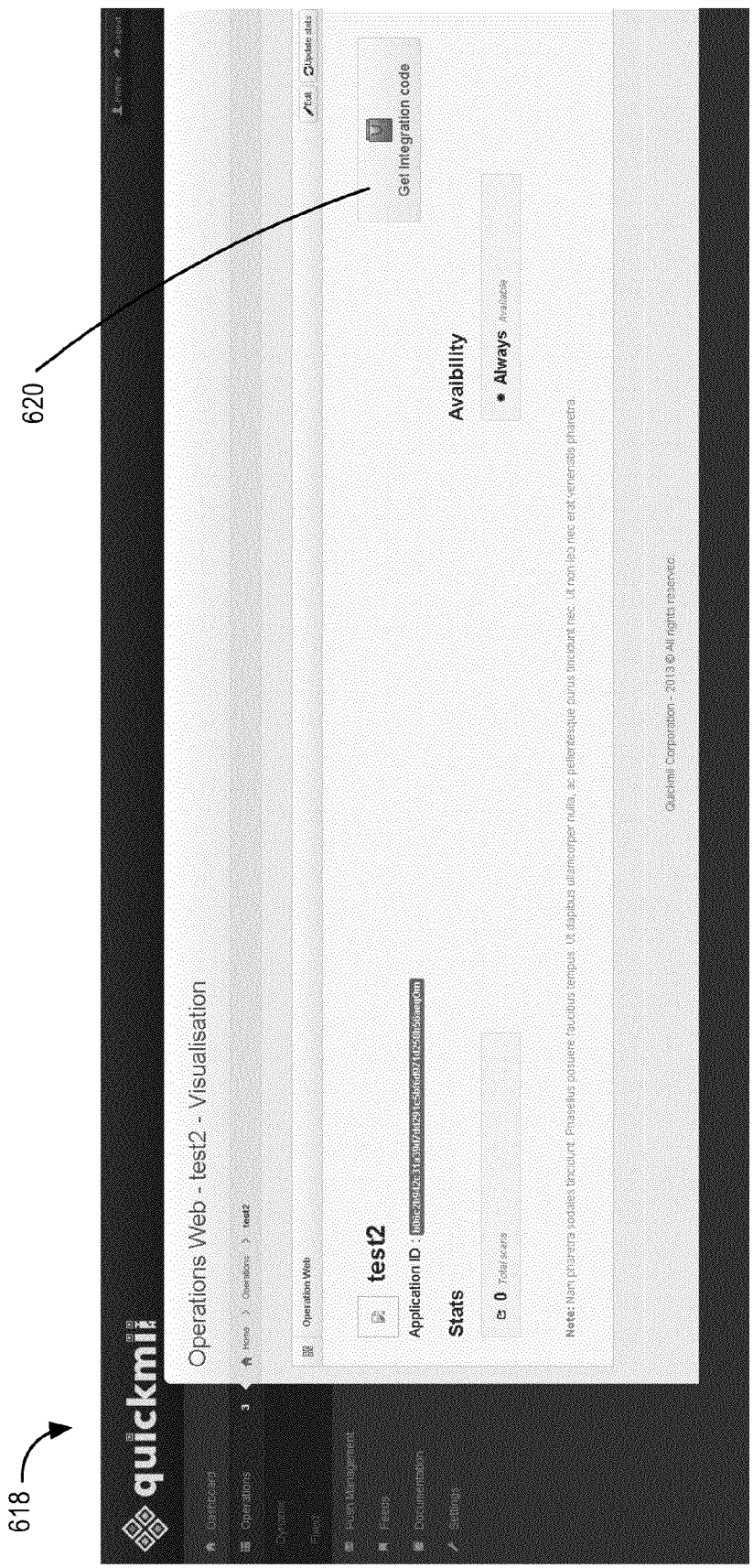

Interface 610 also includes a link 612, an edit button 614, and a delete button 616 that, when selected, deletes the corresponding QR code campaign. Selection of link 612 causes an interface to be displayed that allows a user to view information about the QR code campaign. In this example, user selection of link 612 causes interface 618 (depicted in FIG. 6B) to be displayed.

Interface 618 displays the name of the dynamic campaign, a campaign (or "application") ID that uniquely identifies the dynamic campaign, the number of scans of QR codes of the dynamic campaign (in this example, zero scans have been performed), a status of the availability of the QR codes (in this example, the QR codes are currently available), and a button 620 to obtain integration code to insert into a webpage of the partner or creator of the dynamic campaign. Selection of button 620 causes a window 622 (depicted in FIG. 6C) to be displayed.

Window 622 may be displayed over the display of interface 618. Window 622 includes the campaign ID, an optional JavaScript callback method, and HTML code. The callback method is used to update the user interface on a web page as part of a dynamic scan. This is used in cases where a partner desires to update the web page after a scan by mobile application 210.

A user copies the HTML code and inserts the HTML code on a web page of the user's website. When the web page that includes the HTML code is rendered by a browser (e.g., browser 220), the browser will call a campaign server (e.g., campaign server 230) and pass the application ID, which identifies the QR code campaign to the campaign server. In reply, the campaign server will generate and send a QR code to the browser for display so that one or more end-users that are viewing the browser can initiate a scan of the QR code.

Returning to interface 618, if one or more scans of the QR code have been performed and user profile data was received from mobile devices based on the one or more scans, then interface 618 may include information about each of the scans, such as the actual user profile data (e.g., first and last name, birthday, address, email address, etc.) and time data that indicates when each set of user profile data was received at the campaign server.

Information about scans may be aggregated and displayed on interface 618 (or another interface). Example aggregate information includes a number of scans aggregated over time (e.g., per day or per month), a number of scans aggregated based on location (e.g., number of scans in the United States and number of scans in France), and a number of scans aggregated based on attributes of the users (e.g., number of scans by users who were born in December or number of scans of users who reside in a particular zip code).

Figure 6D:
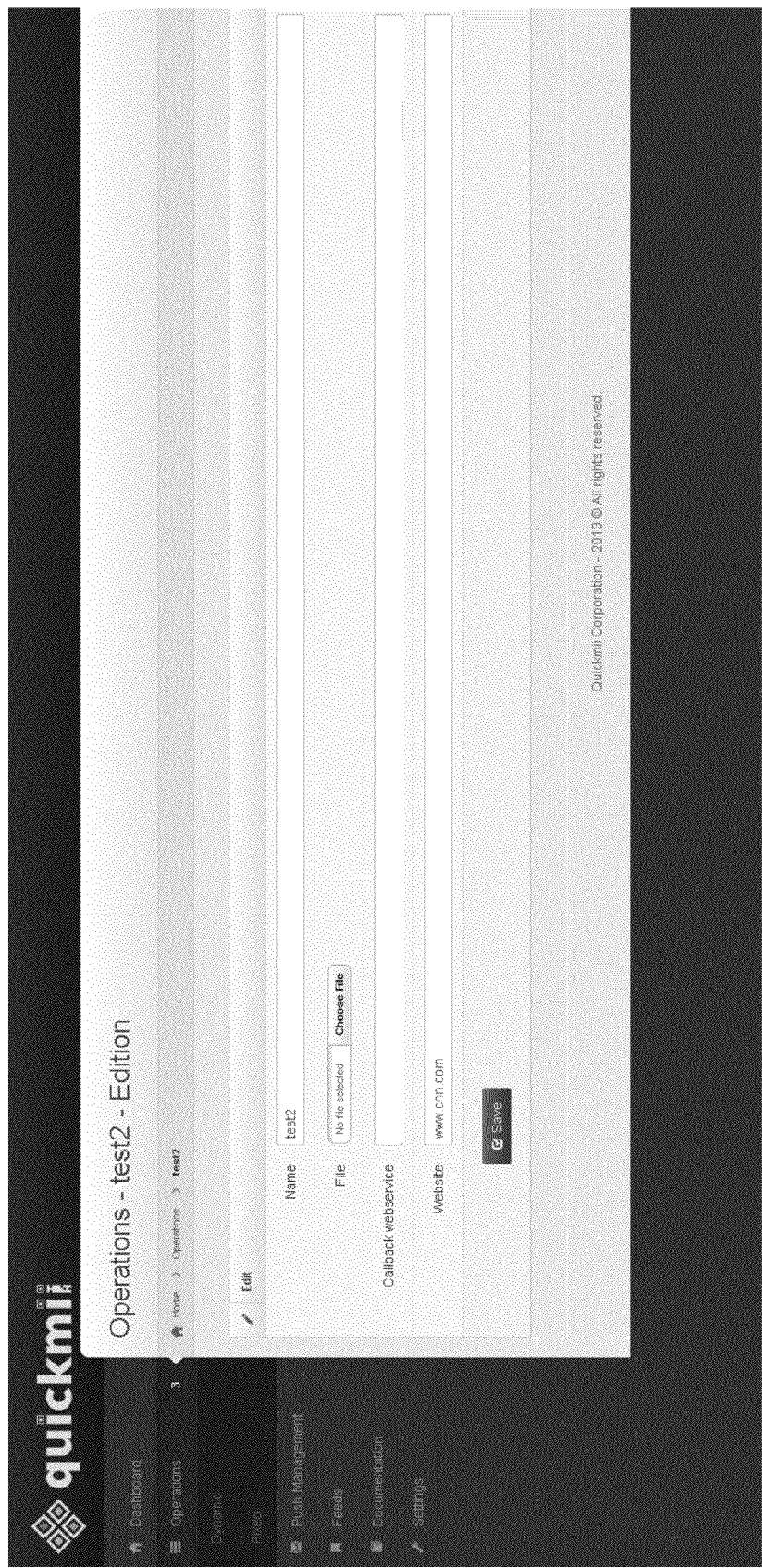
Figure 6E:
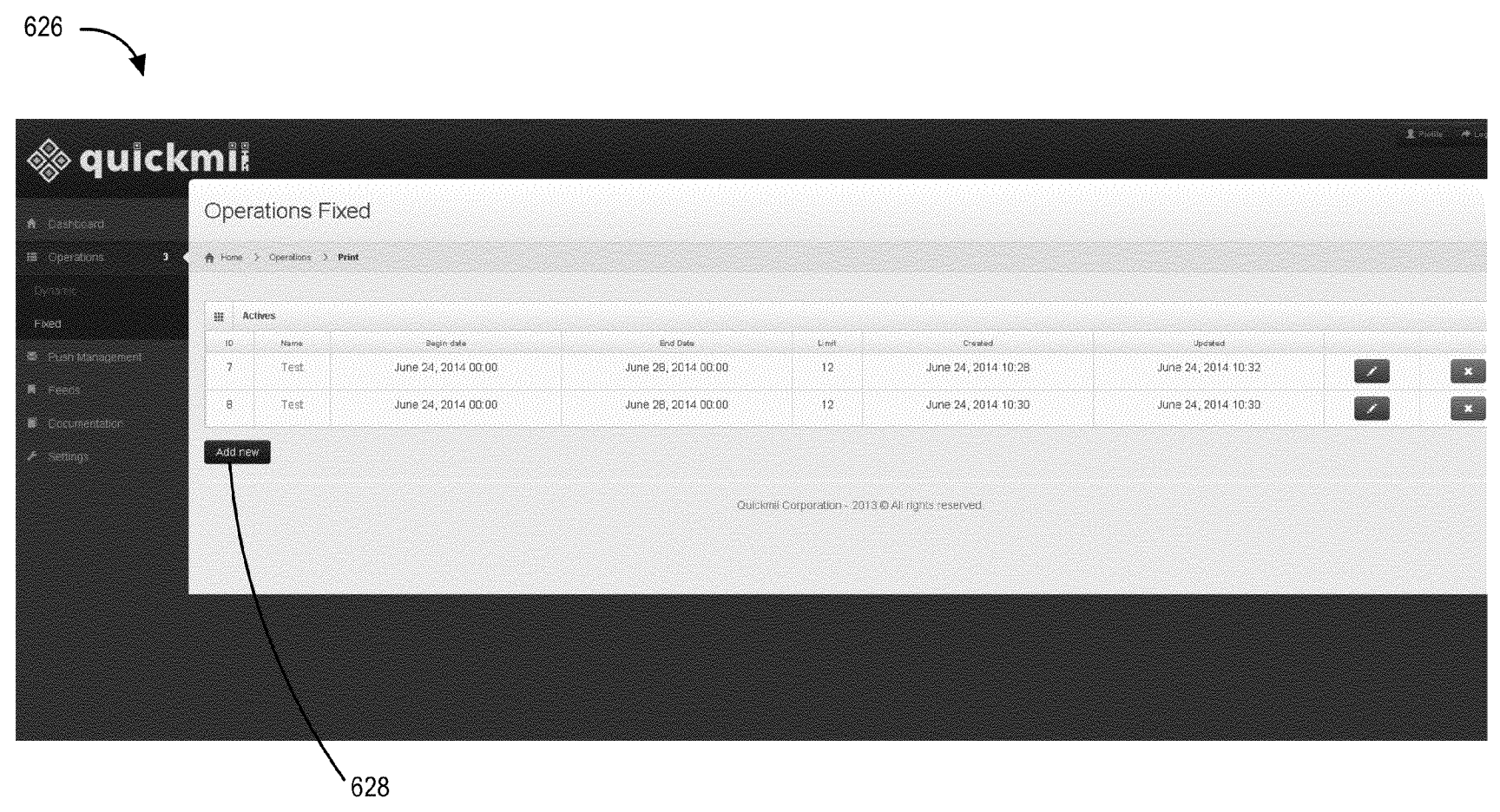

Returning to interface 610 of FIG. 6A, selection of edit button 614 causes an interface to be displayed that allows a user to edit the corresponding campaign. In this example, user selection of edit button 614 causes interface 624 (depicted in FIG. 6D) to be displayed. Interface 624 may be identical to a interface that is displayed if the "Add new" button in interface 610 is selected.

Interface 624 indicates the name of the campaign and allows a user to select a file to upload. The selected file can be used to customize the display of a QR code of the campaign, such as customized QR code 400 in FIG. 4.

Interface 624 also allows a user to specify a callback web service provided by the user or the partner represented by the user. The campaign server that receives user profile data based on scans of QR codes of this campaign will send the user profile data to the specified web service.

Interface 624 also includes a website text field that specifies the website upon which QR codes of this QR code campaign will be displayed. If this text field is filled in, then a mobile application will display the website name in response to performing a scan of a QR code that is generated based on that campaign.

Interface 624 also includes a save button that saves any changes that were made.

Interface 626 may be displayed in response to selecting the "Fixed" link in the left pane of interface 610, 618, or 624. In this example, interface 626 indicates that two fixed QR code campaigns have been created and provides an opportunity to view the details of the fixed QR code campaigns, edit the fixed QR code campaigns, and delete the fixed QR code campaigns.

Interface 626 also includes information about the two fixed QR code campaigns. Such information includes a created date that indicates when the corresponding QR code campaign was created, an updated date that indicates when one or more attributes of the QR code campaign have been last updated, a begin date for the corresponding QR code campaign (which may be days or weeks after the creation date), an end date for the corresponding QR code campaign (which should be after the begin date), and a limit that indicates a number of times the corresponding QR code may be used to upload user profile data. If the limit has been reached, then the corresponding QR code campaign may end prior to the end date.

Figure 6F:

Interface 626 also includes an "Add new" button 628 that, when selected, causes interface 630 depicted in FIG. 6F to be displayed.

Interface 630 is of an interface that allows a partner to specify: (1) a name to a new fixed campaign; (2) a file to upload for customizing a QR code for the fixed campaign; (3) a callback web service to which user profile data received using the QR code will be sent; (4) a begin date for the fixed campaign; (5) an end date for the fixed campaign; (6) a scan limit (that limits the number of times the QR code may be used by mobile applications to transmit user profile data); and (7) attributes, or profile data item types, such as first name, last name, email address, phone number, birthdate, and current geographic location.

Partner Messaging

In an embodiment, based on user profile data transmitted from one or more end-users (of the mobile application), a partner can create messages that target those end-users. The messages may notify the end-users of deals, bargains, or discounts related to a product or service provided by the partner.

Figure 6G:
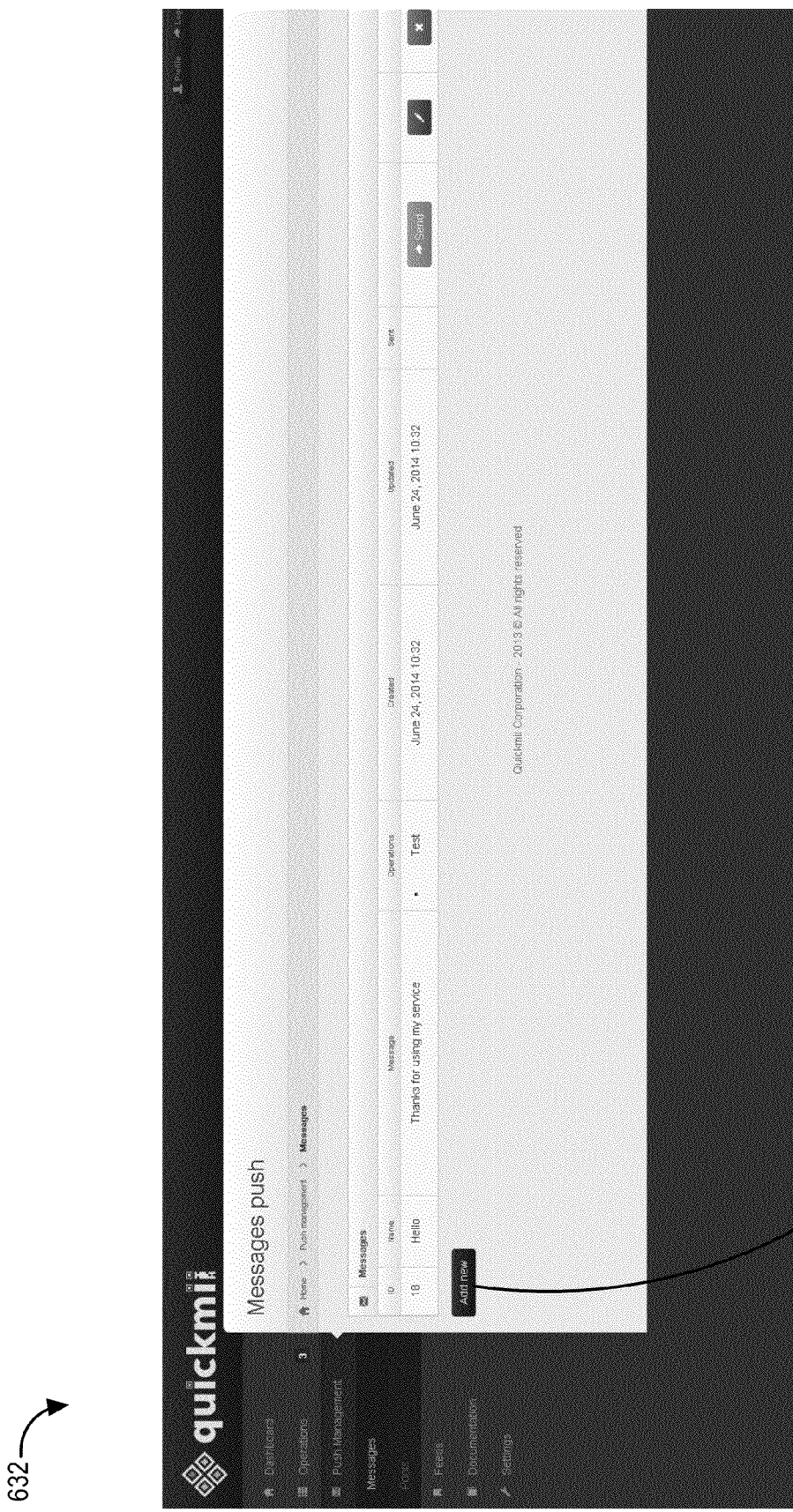

Interface 632 (depicted in FIG. 6G) is of an interface that allows a partner to view and create messages that can be pushed or sent to computing devices that have installed the mobile application (e.g., mobile application 310). Interface 632 may be displayed in response to selecting the "Push Management" text in the left pane of interfaces 610, 618, 624, 626, and 630.

Figure 6H:
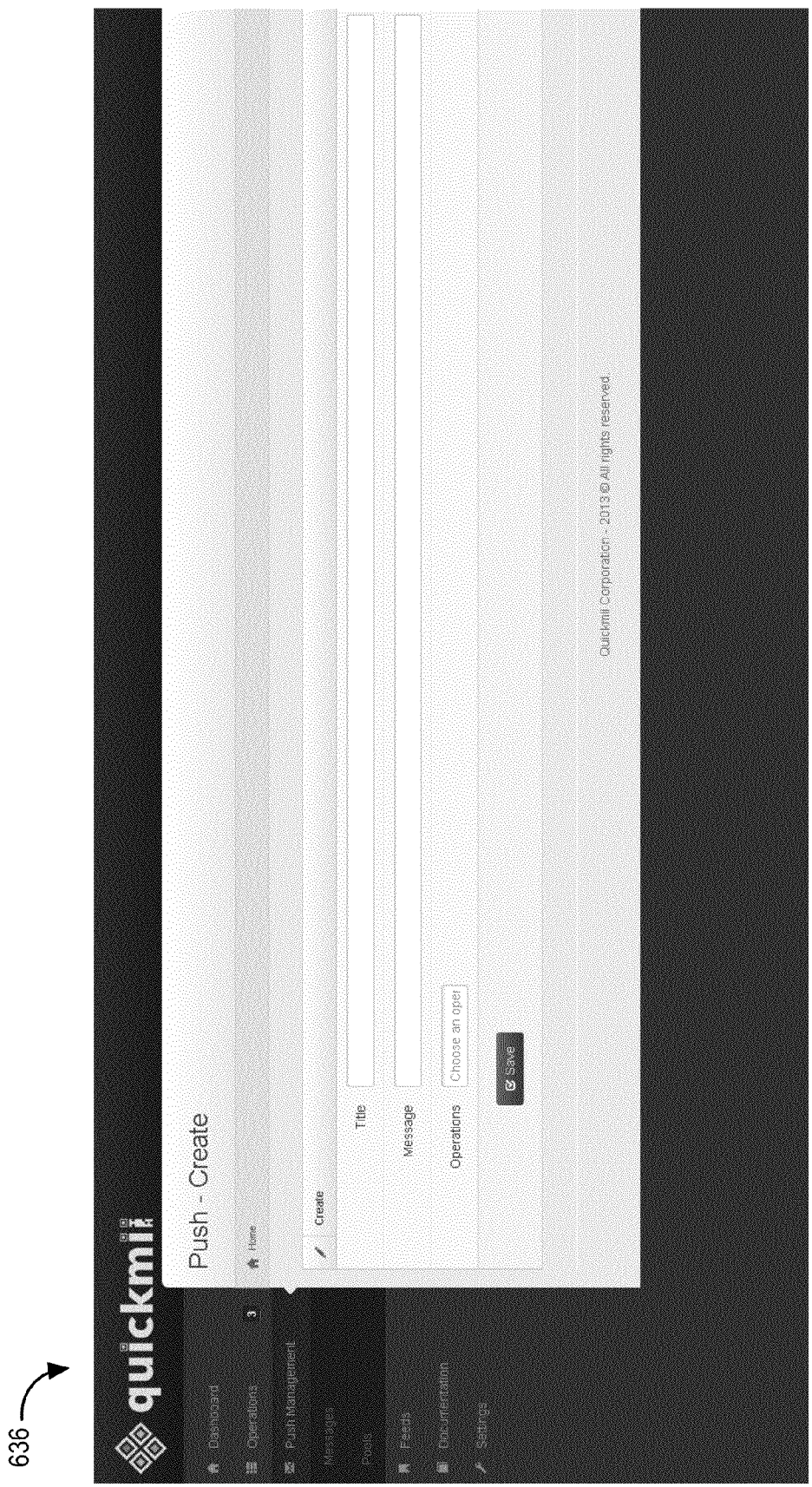

In this example, interface 632 includes information about a push message that has already been created by a registered partner. Such information includes a name of the message, text included in the message, the campaign (or "operation" as indicated in interface 632) with which the message is associated, the date on which the message was created, and the date on which the message was last updated (which may be the same as the creation date). Interface 632 also includes buttons to send the corresponding message, edit the corresponding message, and delete the corresponding message. The interface also includes an "Add new" button 634 that, when selected, causes interface 636 (depicted in FIG. 6H) to be displayed.

Interface 636 allows a user to specify a title for a new message, the message itself, and one or more campaigns (or "operations"). Thus, if user A scanned a QR code for campaign 1, user B scanned a QR code for campaign 2, and a partner specifies both campaigns for a particular message, then the particular message is sent to both users. The message may be emailed to an email address, if the email addresses of the end-users are known. Alternatively, the message may be sent to the mobile applications (e.g., mobile application 210) of the end-users when the corresponding mobile devices are connected to the Internet.

A message may include a URL that is user selectable to allow an end-user to, for example, visit a webpage of the partner of the corresponding QR code campaign.

Figure 6I:
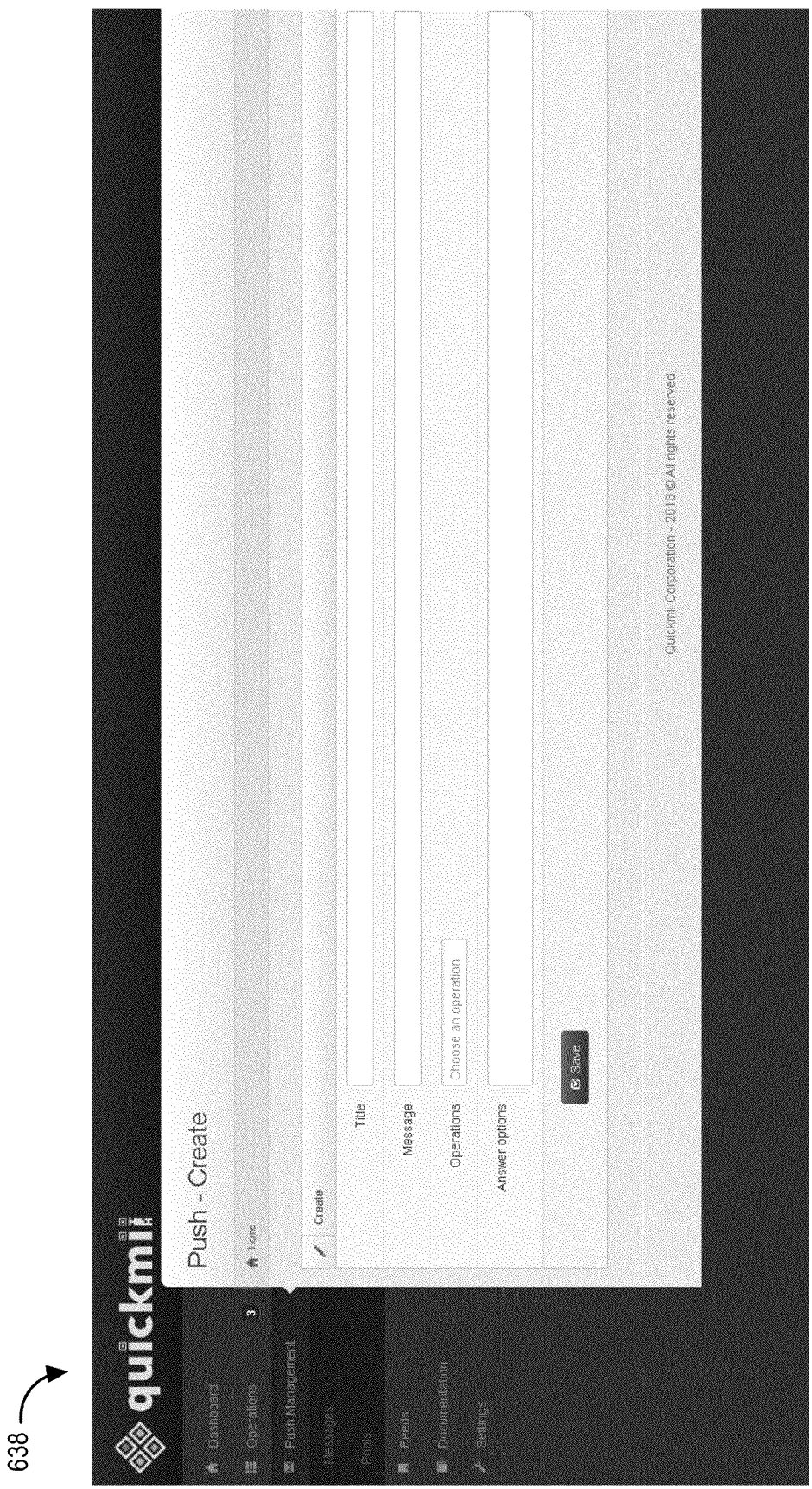
Figure 6J:

Interface 638 (depicted in FIG. 6I) may be displayed in response to user selection of the "Pools" text in the left pane of interfaces 632 and 636. The interface of interface 638 is similar to the interface of interface 636. Both interfaces allow a user to create a message that will be sent to end-users of the mobile application. One difference is that the interface of interface 638 allows a user to create a pool message, which includes multiple options that an end-user of the mobile application may select when viewing the message on his/her mobile device. For example, a pool message may be "What destination for a vacation would you be most interested in?" Options that a partner may specify through the interface may include Europe, the Caribbean, Ak., China, the Middle East, and Africa. Again, the pool message may be transmitted as an email or as a notification that mobile applications receive and store when the corresponding mobile devices are communicatively coupled to the Campaign server that maintains the pool message.

Interface 640 (depicted in FIG. 6H) may be displayed in response to user selection of the "Feeds" text in the left pane of interfaces 610, 618, 636, 638, and others. Interface 640 allows a user to create a feed to which end-users of the mobile application may subscribe. For example, the mobile application may provide an interface that displays feeds to which a user may subscribe. Each feed is associated with a campaign in which the user participated by scanning the corresponding QR code. Interface 640 allows a user to specify: (1) a title for the feed (which may be displayed to end-users of the mobile application); (2) a short message; (3) a long message; (4) a public option; (5) a file; and (6) one or more campaigns (or "operations"). Short messages from different feeds are shown on an end-user's mobile device in a list view. If a specific feed or short message is selected, then the corresponding long messages will be displayed, for example, independent of any long messages of other feeds. The file is an image or graphic (e.g., a logo) that is associated with a feed and may be displayed in response to the feed being selected.

If the public option is checked for a particular feed, then any user of the mobile application can view and subscribe to the particular feed, regardless of whether the user has scanned a QR code of a campaign associated with the partner that established the particular feed. If the public option is not checked for a particular feed, then only users that have scanned a QR code of a campaign associated with the partner that established the feed will be able to view the particular feed. The mobile application may include an interface that displays public feeds and private feeds (if the mobile application scanned QR codes of campaigns associated with the private feeds).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
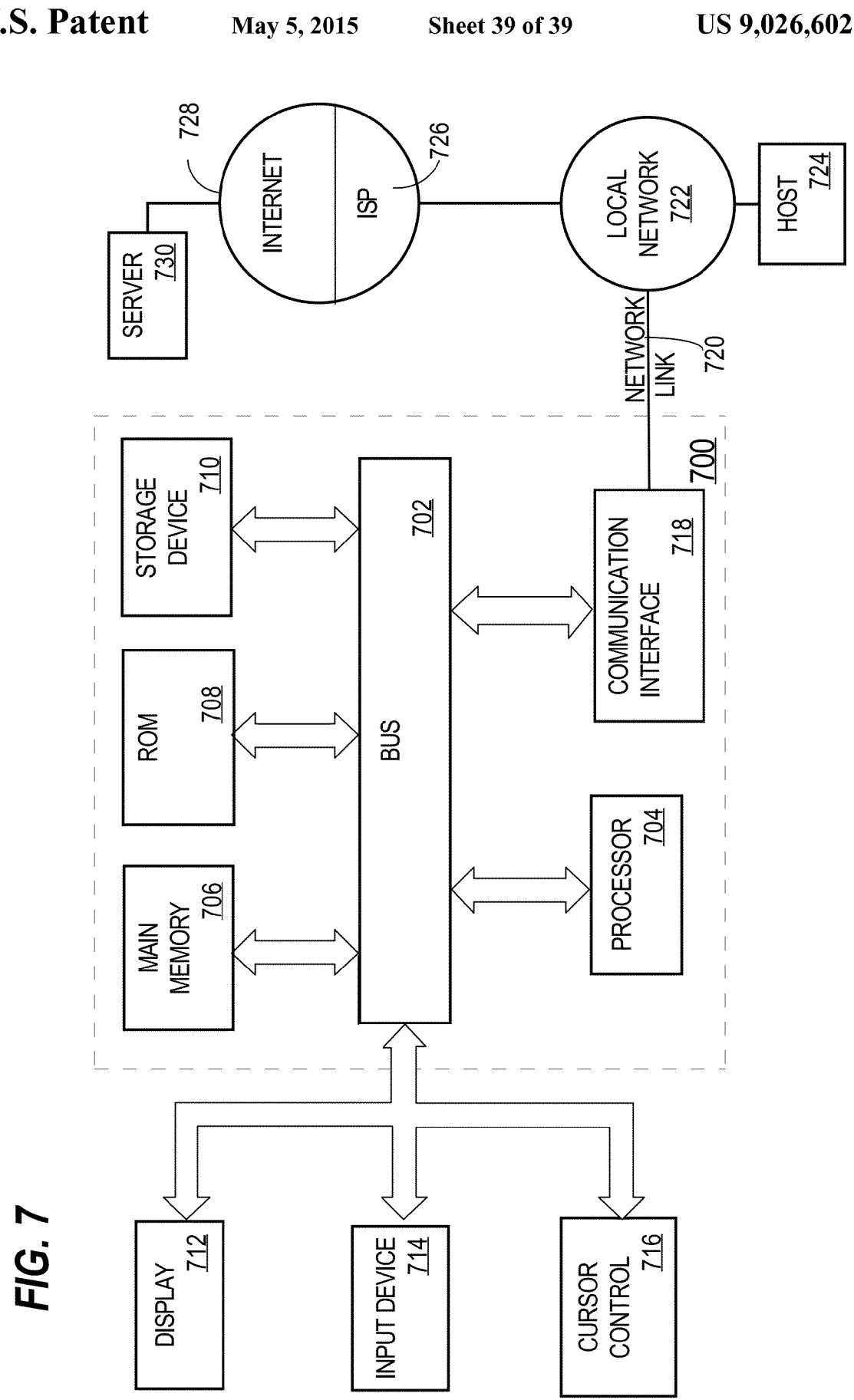
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause:
    decoding, at a mobile device, encoded data to generate decoded data, wherein the decoded data includes a code that is associated with the encoded data;
    analyzing the decoded data;
    in response to analyzing the decoded data:
        identifying, at the mobile device, user profile data, and sending the user profile data from the mobile device over a network;
    wherein sending the user profile data comprises sending the code over the network to a server that uses the code to (1) identify a campaign that is associated with the decoded data and (2) associate the user profile data with the campaign.

2. The one or more storage media of claim 1, wherein decoding the encoded data comprises scanning a two-dimensional barcode.

3. The one or more storage media of claim 1, wherein:
    the encoded data is displayed, on a screen, by a browser that executes on a computing device that is different than the mobile device.

4. The one or more storage media of claim 3, wherein:
the encoded data is displayed adjacent to a digital form that comprises a plurality of fields pertaining to a user profile;
the instructions, when executed by the one or more processor, further cause:
causing the plurality of fields to be filled with the user profile data.

5. The one or more storage media of claim 1, wherein identifying the user profile data comprises:
sending, over a second network, to a second server, a request for the user profile data;
receiving the user profile data from the second server.

6. The one or more storage media of claim 1, wherein:
the instructions, when executed by the one or more processors, further cause, prior to decoding the encoded data, storing the user profile data on the mobile device;
identifying the user profile data comprises identifying the user profile data in local storage of the mobile device.

7. The one or more storage media of claim 1, wherein the encoded data indicates two or more types of user profile data from the following: first name, last name, birthdate, email address, mailing address, country, zip code, phone number, geographic location, job title, or gender.

8. The one or more storage media of claim 7, wherein the encoded data indicates that the two or more types of user profile data are required.

9. The one or more storage media of claim 1, wherein the instructions, when executed by the one or more processors, further cause, prior to sending the user profile data:
identifying a first set of one or more fields that are indicated in the decoded data;
comparing the first set of one or more fields to privacy data that identifies a second set of one or more fields that require manual confirmation before allowing user profile data items corresponding to the second set of one or more fields are to be transmitted over the network;
determining that a particular field in the first set of one or more fields matches a field in the second set of one or more fields;
causing an alert that indicates the particular field to be displayed.

10. The one or more storage media of claim 1, wherein the instructions, when executed by the one or more processors, further cause, prior to decoding the encoded data:
receiving, from a first social network, first user profile data that indicates a first plurality of user profile data items of a particular user;
receiving, from a second social network that is different than the first social network, second user profile data that indicates a second plurality of user profile data items of the particular user;
wherein the user profile data is based on the first plurality of user profile data items and the second plurality of user profile data items.

11. The one or more storage media of claim 10, wherein the instructions, when executed by the one or more processors, further cause:
determining that a conflict exists between a first user profile data item in the first plurality of user profile data items and a second user profile data item in the second plurality of user profile data items;
causing a notification that identifies the conflict to be presented to the particular user.

12. A method comprising:
encoding data to generate encoded data;
receiving, from a browser executing on a computing device, over a network, a request for the encoded data;
wherein generating the encoded data comprises generating the encoded data in response to receiving the request;
causing the encoded data to be presented to one or more mobile devices;
wherein causing the encoded data to be presented comprises causing the encoded data to be displayed as part of a web page that the browser displays and that includes a digital form that comprises a plurality of fields;
receiving, from a mobile device that is different than the computing device, user profile data in response to the mobile device decoding the encoded data;
after receiving the user profile data, causing the plurality of fields of the digital form to be filled in with the user profile data;
wherein the method is performed by one or more computing devices.

13. The method of claim 12, wherein the encoded data encodes field data that identifies two or more types of user profile data from the following: first name, last name, birthdate, email address, mailing address, country, zip code, phone number, geographic location, job title, or gender.

14. The method of claim 12, wherein:
sending the encoded data to the browser comprises sending, to the browser, a key;
the method further comprising, using the key to identify the browser;
wherein causing the plurality of fields of the digital form to be filled in with the user profile data comprises causing the plurality of fields to be filled in based on the key.

15. The method of claim 12, wherein:
the method is performed by a first party;
causing the encoded data to be presented comprises sending the encoded data to a second party that is different than the first party and that communicates with the first party to create a campaign;
the second party causes the encoded data to be displayed on a medium that is scannable by the mobile device.

16. The method of claim 15, wherein the data includes a code, the method further comprising:
receiving the user profile data comprises receiving a code from the mobile device;
determining that the user profile data is associated with the campaign based on the code.

17. The method of claim 12, further comprising:
receiving, from a first party, campaign initiation data that indicates one or more attributes of a campaign;
in response to receiving the campaign initiation data, creating the campaign;
storing association data that associates the encoded data with the campaign;
after receiving the user profile data, sending, based on the association data, the user profile data to the first party.

18. The method of claim 17, wherein sending the user profile data comprises sending the user profile data to a web service provided by the first party in response to receiving the user profile data from the mobile device.

19. The method of claim 12, further comprising, prior to encoding the data:
receiving, from a first party, campaign initiation data that indicates one or more attributes of a campaign;
in response to receiving the campaign initiation data, creating the campaign;

causing markup language code to be displayed to the first party, wherein the markup language code includes campaign identification data that identifies the campaign;

prompting the first party to insert the markup language code in a web page of the first party.

20. A method comprising:

decoding, at a mobile device, encoded data to generate decoded data, wherein the decoded data includes a code that is associated with the encoded data;

analyzing the decoded data;

in response to analyzing the decoded data:
identifying, at the mobile device, user profile data, and sending the user profile data from the mobile device over a network;

wherein sending the user profile data comprises sending the code over the network to a server that uses the code to (1) identify a campaign that is associated with the decoded data and (2) associate the user profile data with the campaign.

21. The method of claim 20, wherein decoding the encoded data comprises scanning a two-dimensional barcode.

22. The method of claim 20, wherein:

the encoded data is displayed, on a screen, by a browser that executes on a computing device that is different than the mobile device.

23. The method of claim 22, wherein:

the encoded data is displayed adjacent to a digital form that comprises a plurality of fields pertaining to a user profile;

the method further comprising causing the plurality of fields to be filled with the user profile data.

24. The method of claim 20, wherein identifying the user profile data comprises:

sending, over a second network, to a second server, a request for the user profile data;

receiving the user profile data from the second server.

25. The method of claim 20, further comprising:

prior to decoding the encoded data, storing the user profile data on the mobile device;

identifying the user profile data comprises identifying the user profile data in local storage of the mobile device.

26. The method of claim 20, wherein the encoded data indicates two or more types of user profile data from the following: first name, last name, birthdate, email address, mailing address, country, zip code, phone number, geographic location, job title, or gender.

27. The method of claim 26, wherein the encoded data indicates that the two or more types of user profile data are required.

28. The method of claim 20, further comprising, prior to sending the user profile data:

identifying a first set of one or more fields that are indicated in the decoded data;

comparing the first set of one or more fields to privacy data that identifies a second set of one or more fields that require manual confirmation before allowing user profile data items corresponding to the second set of one or more fields are to be transmitted over the network;

determining that a particular field in the first set of one or more fields matches a field in the second set of one or more fields;

causing an alert that indicates the particular field to be displayed.

29. The method of claim 20, further comprising, prior to decoding the encoded data:

receiving, from a first social network, first user profile data that indicates a first plurality of user profile data items of a particular user;

receiving, from a second social network that is different than the first social network, second user profile data that indicates a second plurality of user profile data items of the particular user;

wherein the user profile data is based on the first plurality of user profile data items and the second plurality of user profile data items.

30. The method of claim 29, further comprising:

determining that a conflict exists between a first user profile data item in the first plurality of user profile data items and a second user profile data item in the second plurality of user profile data items;

causing a notification that identifies the conflict to be presented to the particular user.

31. One or more storage media storing instructions which, when executed by one or more processors, cause:

encoding data to generate encoded data;

receiving, from a browser executing on a computing device, over a network, a request for the encoded data;

wherein generating the encoded data comprises generating the encoded data in response to receiving the request;

causing the encoded data to be presented to one or more mobile devices;

wherein causing the encoded data to be presented comprises causing the encoded data to be displayed as part of a web page that the browser displays and that includes a digital form that comprises a plurality of fields;

receiving, from a mobile device that is different than the computing device, user profile data in response to the mobile device decoding the encoded data;

after receiving the user profile data, causing the plurality of fields of the digital form to be filled in with the user profile data.

32. The one or more storage media of claim 31, wherein the encoded data encodes field data that identifies two or more types of user profile data from the following: first name, last name, birthdate, email address, mailing address, country, zip code, phone number, geographic location, job title, or gender.

33. The one or more storage media of claim 31, wherein:

sending the encoded data to the browser comprises sending, to the browser, a key;

the instructions, when executed by the one or more processors, further cause, using the key to identify the browser;

wherein causing the plurality of fields of the digital form to be filled in with the user profile data comprises causing the plurality of fields to be filled in based on the key.

34. The one or more storage media of claim 31, wherein:

the steps of receiving and causing are performed by a first party;

causing the encoded data to be presented comprises sending the encoded data to a second party that is different than the first party and that communicates with the first party to create a campaign;

the second party causes the encoded data to be displayed on a medium that is scannable by the mobile device.

35. The one or more storage media of claim 34, wherein the data includes a code, wherein the instructions, when executed by the one or more processors, further cause:

receiving the user profile data comprises receiving a code from the mobile device;

determining that the user profile data is associated with the campaign based on the code.

36. The one or more storage media of claim 31, wherein the instructions, when executed by the one or more processors, further cause:
- receiving, from a first party, campaign initiation data that indicates one or more attributes of a campaign;
- in response to receiving the campaign initiation data, creating the campaign;
- storing association data that associates the encoded data with the campaign;
- after receiving the user profile data, sending, based on the association data, the user profile data to the first party.

37. The one or more storage media of claim 36, wherein sending the user profile data comprises sending the user profile data to a web service provided by the first party in response to receiving the user profile data from the mobile device.

38. The one or more storage media of claim 31, wherein the instructions, when executed by the one or more processors, further cause, prior to encoding the data:
- receiving, from a first party, campaign initiation data that indicates one or more attributes of a campaign;
- in response to receiving the campaign initiation data, creating the campaign;
- causing markup language code to be displayed to the first party, wherein the markup language code includes campaign identification data that identifies the campaign;
- prompting the first party to insert the markup language code in a web page of the first party.

* * * * *